United States Patent
Richfield

(10) Patent No.: US 8,788,263 B1
(45) Date of Patent: Jul. 22, 2014

(54) NATURAL LANGUAGE PROCESSING FOR ANALYZING INTERNET CONTENT AND FINDING SOLUTIONS TO NEEDS EXPRESSED IN TEXT

(71) Applicant: Steven E. Richfield, Edgewood, WA (US)

(72) Inventor: Steven E. Richfield, Edgewood, WA (US)

(*) Notice: Subject to any disclaimer, the term of this patent is extended or adjusted under 35 U.S.C. 154(b) by 0 days.

(21) Appl. No.: 13/836,678

(22) Filed: Mar. 15, 2013

(51) Int. Cl.
*G06F 17/27* (2006.01)

(52) U.S. Cl.
USPC ................................................ 704/9

(58) Field of Classification Search
None
See application file for complete search history.

(56) References Cited

U.S. PATENT DOCUMENTS

| | | | | |
|---|---|---|---|---|
| 4,270,182 A * | 5/1981 | Asija | | 704/8 |
| 4,704,695 A * | 11/1987 | Kimura et al. | | 706/50 |
| 5,913,209 A * | 6/1999 | Millett | | 1/1 |
| 5,960,385 A * | 9/1999 | Skiena et al. | | 704/9 |
| 5,963,894 A * | 10/1999 | Richardson et al. | | 704/9 |
| 7,031,910 B2 * | 4/2006 | Eisele | | 704/10 |
| 7,313,556 B2 * | 12/2007 | Gallivan et al. | | 1/1 |
| 7,680,649 B2 * | 3/2010 | Park | | 704/10 |
| 8,209,175 B2 * | 6/2012 | Mukerjee et al. | | 704/251 |
| 8,380,492 B2 * | 2/2013 | Xu et al. | | 704/9 |
| 8,428,948 B1 * | 4/2013 | Roizen et al. | | 704/251 |
| 2007/0061348 A1 * | 3/2007 | Holland et al. | | 707/100 |
| 2009/0306959 A1 * | 12/2009 | Rappoport et al. | | 704/2 |
| 2010/0211381 A1 * | 8/2010 | Fux et al. | | 704/10 |
| 2013/0159235 A1 * | 6/2013 | Hatami-Hanza | | 706/46 |

OTHER PUBLICATIONS

J. R. Hobbs, D. E. Appelt, J. S. Bear, D. J. Israel, and W. M. Tyson. Fastus: A system for extracting information from natural-language text. Technical Note No. 519, 1992.*

Lynam, T. R., C. L. A. Clarke, and G. V. Cormack. "Information extraction with term frequencies." Proceedings of the first international conference on Human language technology research. Association for Computational Linguistics, 2001.*

Hobbs, Jerry R., et al. "SRI International: Description of the FASTUS system used for MUC-4." Proceedings of the 4th conference on Message understanding. Association for Computational Linguistics, 1992.*

Graesser, Arthur C., et al. "AutoTutor: A simulation of a human tutor." Cognitive Systems Research 1.1 (1999): 35-51.*

* cited by examiner

*Primary Examiner* — Brian Albertalli

(74) *Attorney, Agent, or Firm* — Craig M. Stainbrook; Stainbrook & Stainbrook, LLP

(57) ABSTRACT

A natural language processing methodology to automatically transform push advertising into pull advertising. Text found in forum, blog, and social media postings throughout the Internet is grammatically analyzed to identify potential customers who have expressed a clear problem. Only parsing rules with the least likely elements present are evaluated. In response, personalized replies are produced that contain pertinent and useful information about a potential product or service. Those replies appear to come from other Internet users, thus converting expressed needs of user/prospects into discussions with sales technicians.

9 Claims, 9 Drawing Sheets

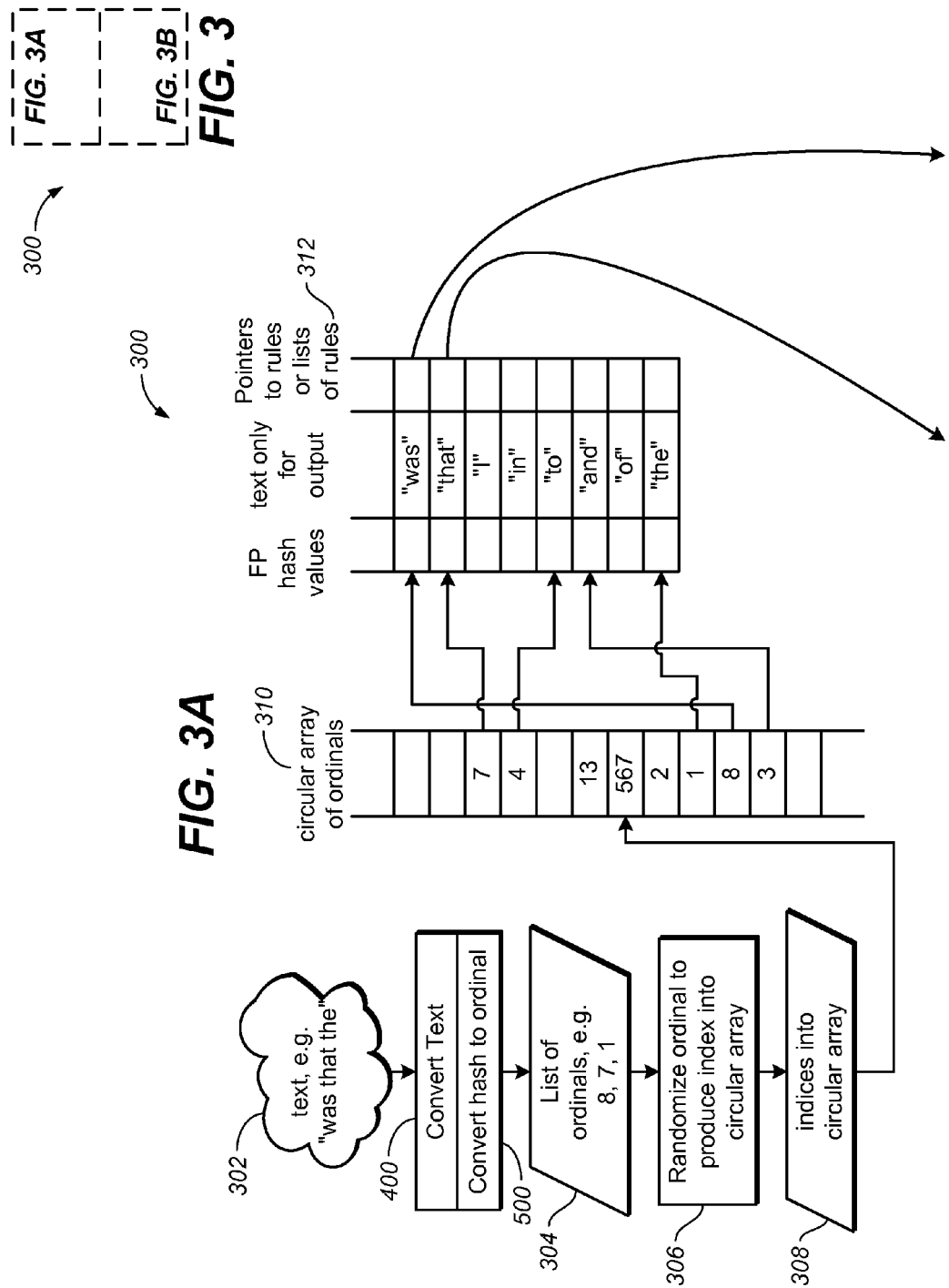

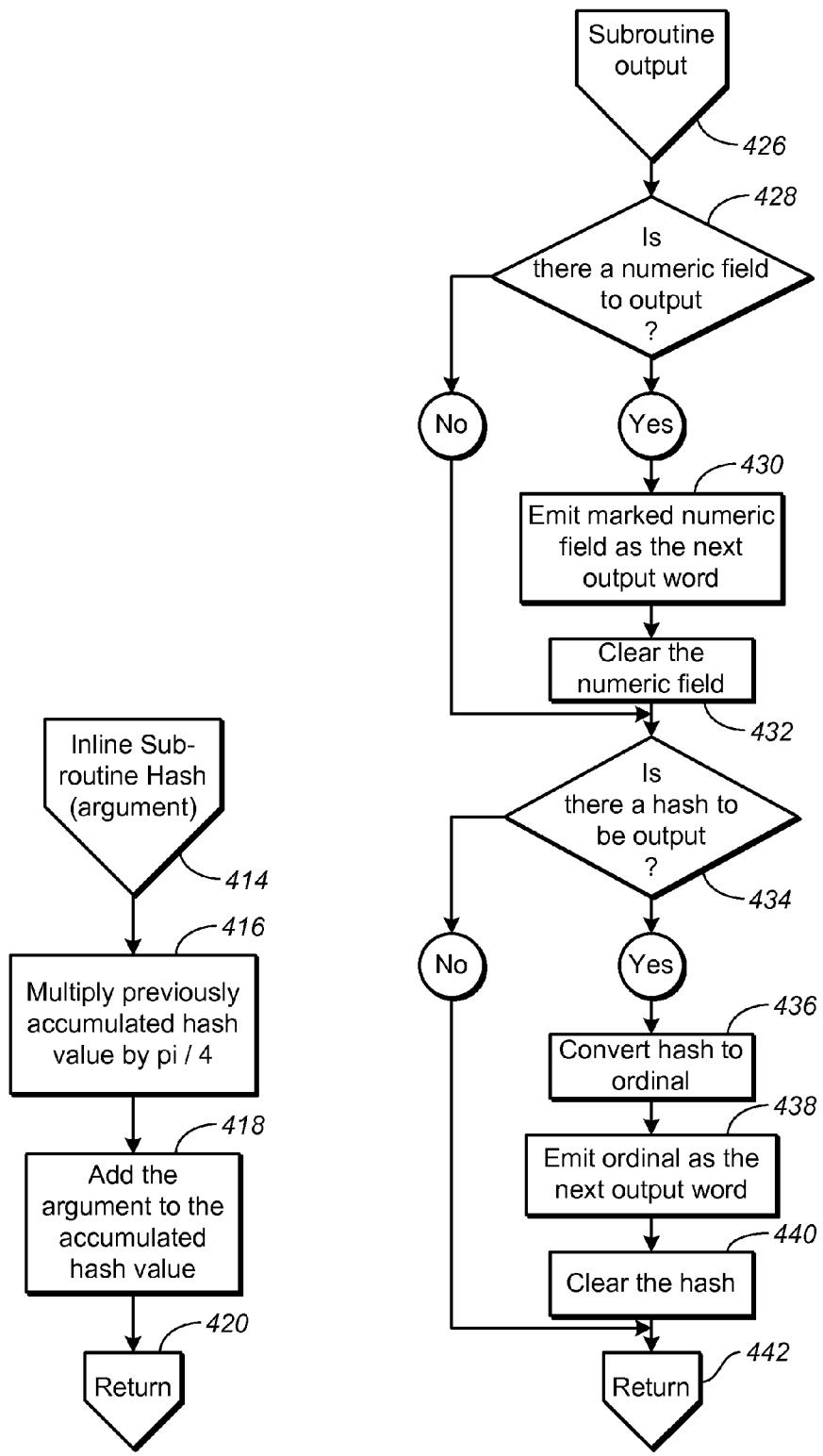
FIG. 4A  FIG. 4B

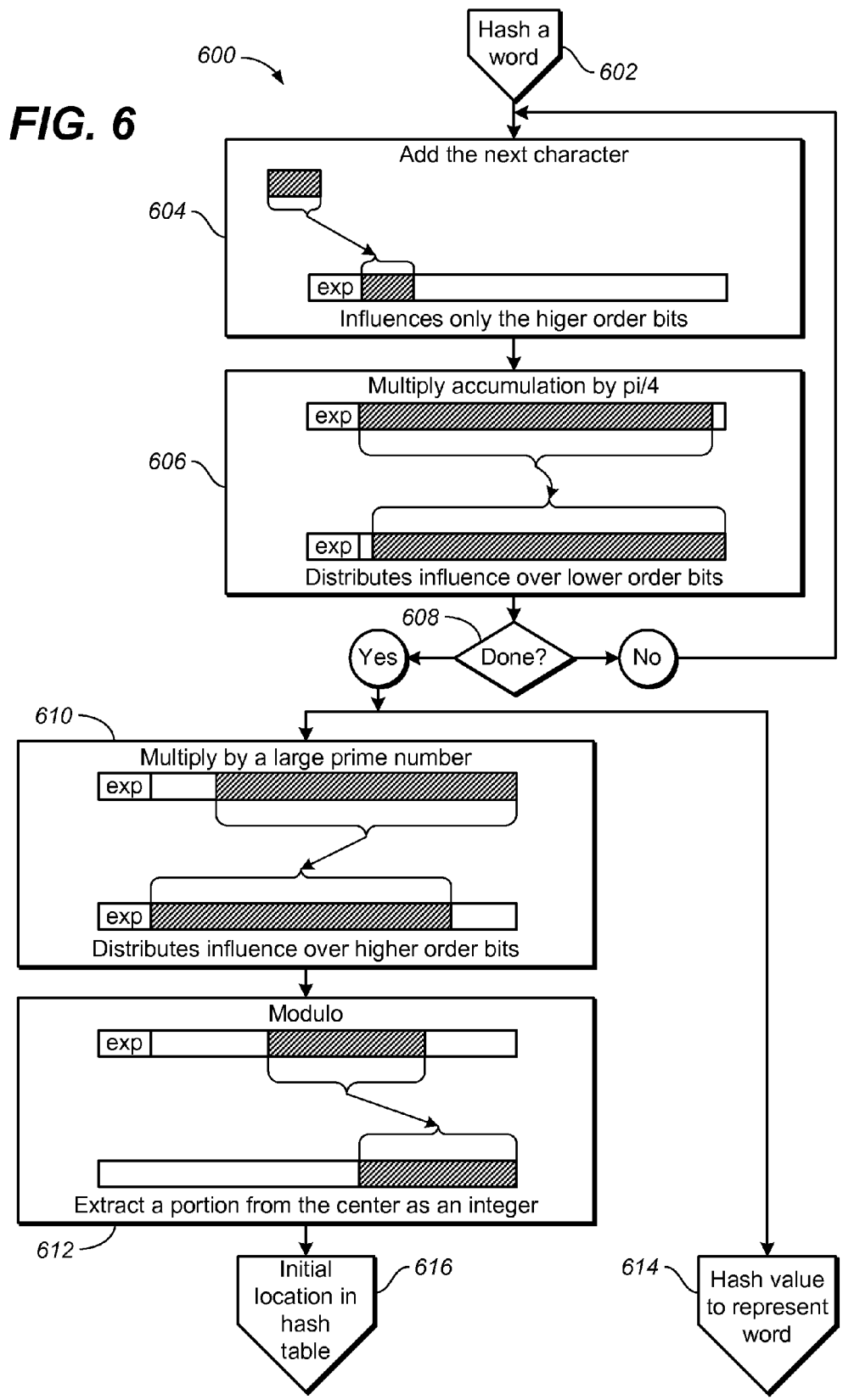

NATURAL LANGUAGE PROCESSING FOR
ANALYZING INTERNET CONTENT AND
FINDING SOLUTIONS TO NEEDS
EXPRESSED IN TEXT

CROSS REFERENCES TO RELATED
APPLICATIONS

Not applicable. The present application is an original and first-filed United States Utility Patent Application.

STATEMENT REGARDING FEDERALLY
SPONSORED RESEARCH OR DEVELOPMENT

Not applicable.

THE NAMES OR PARTIES TO A JOINT
RESEARCH AGREEMENT

Not applicable.

INCORPORATION BY REFERENCE OF
MATERIAL SUBMITTED ON A COMPACT DISC

Not applicable.

BACKGROUND OF THE INVENTION

1. Field of the Invention

The present invention relates generally to methods of extracting information from text, and more particularly to a natural language processing method of analyzing Internet content for advertising purposes, and still more particularly to a method of opportunistic natural language processing in which only rules with the least likely elements present are evaluated.

2. Background Discussion

For nearly half a century, Artificial Intelligence (AI) research has unsuccessfully sought an approach leading to "understanding" natural language (NL) as well as an average five-year-old child understands it. So far, that quest has been fruitless, and the present invention does not shed any additional light on that quest.

The very first NL processing program, the ELIZA program written by Dr. Joseph Weizenbaum in 1966, showed that much was possible without any understanding at all, by simply looking for the presence of particular words and phrases. Dr. Weizenbaum subsequently, in 1976, wrote the book, *Computer Power and Human Reason, from Judgment to Calculation*, which carefully crafted the hard upper bounds of approaches like those used in ELIZA. Those upper bounds have been surpassed, though only slightly, with the later introduction of Fuzzy Logic. Still, there is no path seen to extend the approaches like those used in ELIZA to ever equal the capabilities of a 5-year-old, regardless of how much future development and computer power might be applied.

Seeing that normal human understanding would forever remain out of reach with the Eliza approach, most AI researchers worked on other methods. They have failed to produce anything of significant value, despite nearly half a century of creative work at major universities.

The Internet is long past due for a technological makeover. Google was the last big technological advance, allowing users to break free of the chains of hyperlinks and the Internet Yellow Pages. This next significant advance will allow users to state their problems in ordinary English, rather than having to instruct a search engine, or even understand their problem enough to formulate a question. All they need to do is just mention their present challenge/problem/irritation somewhere, and if there is a good solution, they will soon receive a message from another Internet user providing a solution and explaining how to overcome their challenge. This is a much more effective marketing mechanism than the presently used advertisements. Of course there will remain plenty of need for search engines, especially in areas that are already well understood. But this is a big step and it raises the question: Where is this headed?

Science Fiction authors have been speculating on the destiny of the Internet since times long before the Internet even existed. A mind-controlled version of the "Internet" was presented in the movie, Forbidden Planet, where thought produced anything, including monsters that killed the neighbors.

In the book *The Fall of Colossus*, the first sequel in the trilogy that started with the movie Colossus (The Forbin Project), people around the world had Internet-like access to an omniscient, artificially intelligent mind having great power.

The new Hulu.com series The Booth at the End explores the idea of an advanced intelligence advising people. The advice leads people to perform seemingly unrelated actions to induce a butterfly-effect, resulting in the realization of their wishes or leading to some other result that satisfies (or kills) them.

In the Future Tense article, Could the Internet Ever "Wake Up"?, published by the Technology section of Slate.com, authors Christof Koch and Robert Sawyer examine the prospect of the Internet becoming conscious.

And in the AI computer program the present inventor wrote behind DrEliza.com, statements of symptoms made by patients with chronic illnesses are analyzed. The program often asks questions of patients to "drill down" into their conditions. DrEliza.com then speculates on cause-and-effect chain(s) leading to the described illness. This is believed to be the only Natural Language Processing (NLP) program that does something of intrinsic value.

The present inventor's evolving vision is built on the Internet as it is, but with a very special AI synthetic "user," who lurks while watching everything, and sends custom-formatted notifications whenever anyone posts content that shows an opportunity to produce a valuable response. This could easily accomplish everything from selling products better than present advertising methods to displaying new cures for people's illnesses to solving political problems. People registered to receive notifications of certain content would be notified, but most of the people on the Internet would be entirely unaware of the AI synthetic "user," other than perhaps noticing that every time they post about a problem, someone quickly contacts them with a good solution to their problem.

Google once offered the ability to store a search string, and sent notifications whenever new content appeared on the Internet that seemingly met the search criteria. This was unable to accomplish the purposes of the present invention for many reasons, but it is an interesting prior art system because it is the only art known to the present inventor in which a computer watched the Internet for interesting content, and then sent timely notifications when the content was found. The present invention will do the same, only with a much greater ability to eliminate false negatives and positives, so that it can be a practical and commercially valuable component in an automated marketing system.

The Internet as a Sales Tool: Long before computers existed people sought ways to identify prospective "customers" for ideas and products, ranging from religions to cookware, cigarettes to ships. They have also sought various ways to reach their prospective "customers" once they were identified. Relatively recently, activity was driven by mailing lists, sometimes accompanied by additional information to assist in selecting who to contact. Many companies had dedicated and expensive departments devoted to telephone and direct mail advertising. Of course, unwilling prospects quickly adapted to this by discarding "junk mail" without even bothering to open it.

Early pre-Internet computers held databases of prospects and bulk mail letter writing programs to process those databases into messages to send to prospects. This tipped the economic balance in favor of direct mail over telephone advertising, but only those people who appeared in some database could be reached. When computers replaced people in producing the messages, the vast majority of "junk mail" was directed to people uninterested in reading it, so the junk mail was quickly discarded upon receipt.

The dawn of the Internet brought email, which was infinitely less expensive than "snail mail," soon followed by vendors who would send out millions of email solicitations. Here, even a 1/10,000 sales rate was seen as a "success." However, email programs soon received additional features to discard junk emails, so bulk email programs now rarely even reach the people to whom emails are sent.

Then search engines like Google appeared, and people could search for prospects based on what people posted on the Internet, though dozens of "hits" would have to be examined to find a genuine prospect, and then a search for contact information would have to be conducted. Done well, this could lead to personally-produced emails that would reach valid prospects. However, this process was expensive, except in the case of high-value products to reliably identifiable prospects. Even this was problematic because by then most people skipped over any emails that looked to be selling something.

This caused a massive shift in Internet advertising, firstly because bulk email is identifiable by email providers like Google, Yahoo, and Microsoft by the appearance of many emails from the same place carrying similar content. These are now summarily discarded as "spam" without their recipients ever even seeing them. Secondly, bulk emails are easily recognizable spam, so even if one evades spam filters, most people don't even bother reading them.

Advertising then shifted to placing ads on nearly every web page in an attempt to evade the spam filters. However, as of this writing, the latest iterations of spam filters now eliminate ads from web pages using strategies such as reading every web page twice, comparing the two copies, and eliminating anything that changes between the readings. They also access a central database of advertisers to eliminate all displays from identified Internet advertisers.

The present invention completely sidesteps this seemingly endless cat-and-mouse game of spam and filters. It provides an automated way to transform the Internet into something characterized by mutually and reciprocally desired exchanges, rather than by a cesspool of spam that crowds and pollutes the Internet. Of course, as with any powerful technology, mishandling and inappropriate application could produce undesirable results.

The Internet as a Problem Solving Tool: The advent of search engines, like Google.com, has transformed the Internet into the most powerful research tool ever known. However, search engines only display "relevant" information in response to explicit and intentionally devised searches expressed in search strings. They do not answer questions or solve problems. However, now that the Internet has become congested with both commercial information and drivel it has become nearly impossible to find the information needed to answer questions and solve problems.

The first commercial-quality question answering program on the Internet is http://WolframAlpha.com. In creating this program, it was quickly discovered that separate subroutines were needed for each type of question. While (at present) the program can easily relate different currencies, it is unable to answer any chemistry-related questions, to take an example. Hence, WolframAlpha seems to be broadly inapplicable to answering questions, except within its own fairly restricted domains, where it admittedly performs quite well.

The first problem solving program on the Internet is http://DrEliza.com, written by the present inventor. This invention emerged as a rewrite of DrEliza was being contemplated. DrEliza is designed to diagnose chronic illnesses in sufficient detail to lead to known cures. DrEliza works not by "understanding" what people are saying, but rather by recognizing embedded statements of symptoms within unstructured statements about health conditions.

DrEliza.com is believed to be the only serious program designed to solve problems, rather than answer questions.

One of the essential things that DrEliza.com has, that other systems have missed, is the ability to recognize "statements of ignorance" embedded in people's explanations. In the vast majority of situations, a person's explanation of a problem contains subtle indicators of what he or she does not know, that if he knew he would have already solved the problems. Of course users don't know what they don't know; but another person (or computer) that does know what a user needs to know can easily recognize these "tells" and act upon them. Experts in all areas are quite familiar with recognizing statements of ignorance of important concepts in their respective areas of expertise. For example, any patent agent or patent attorney, when listening to someone expressing a need for a device to solve a particular problem, knows to suggest that he or she search USPTO.gov to see what has already been invented to do the job.

Selling Products: "Selling products" is fundamentally the process of explaining how something solves someone's problems. In a very real sense, DrEliza.com is "selling" its solutions to people's chronic health problems, because if they don't "buy" the advice, the advice can't help them. The challenge is in getting a prospective customer to state a problem in a way that a particular product can be related to the particular problem. This has remained an unsolved problem on the Internet—leading to the obnoxious ads that now litter nearly all Internet sites.

However, analyzing much/most/all of what a person writes for the subtle "tells" indicating the particular products or kinds of products he might be interested in acquiring is quite within present-day Natural Language Processing (NLP) methods. There is just one problem: present methods advanced enough to do the job are orders of magnitude too slow for any practical use.

To illustrate, putting DrEliza.com on the Internet required turning off much of its analysis to enable it to respond to a screen full of text within a few seconds. Keeping up with the entire Internet would require several orders of magnitude more speed, which is exactly what the present invention provides.

A system to sell a list of specific products would comprise much less than 1% of a great all-knowing Internet foreseen by some authors. The structure would be pretty much the same, but the tables would only have to contain just enough entries to recognize needs for the particular products, and not for any of the remainder of all human knowledge. For example, everything not written in the first person, and everything lacking a verb indicating a problem, could be summarily ignored.

It is one thing to produce a correct answer and quite another thing to convince a user that an answer is indeed correct. WolframAlpha "sells" its answers in two ways: (1) instead of simply declaring the answer, it embeds the answer into a sentence stating precisely what it is an answer to, and (2) it displays exactly how it parsed the question and developed several possible answers, one of which was chosen for display.

DrEliza "sells" its diagnoses by identifying the sub-conditions that appear to lead to the presenting symptoms, and asking about other symptoms that those same sub-conditions would probably produce. Being asked about subtle symptoms that they never mentioned is enough to convince most users that DrEliza is on the right track. Further, DrEliza displays probabilities of its diagnoses, that increase toward 100% (or decrease toward 0%) as the user answers various questions. In most cases the potential sub-conditions can be easily tested for. Where the sub-conditions are reversible, users often achieve permanent cures rather than temporary treatments.

Review of Various Relevant Prior Art Components, Their Deficiencies in Solving the Problem, and Modifications Needed: The technology for producing form letters is well known, along with various enhancements to evade spam filters. The most salient modification needed for the present invention include the ability to respond to input metadata by varying the format or including the metadata into the text. The present inventor considers this obvious to anyone skilled in the art.

Technologies for "crawling" the Internet are similarly well known, and there are currently a number of both commercial and "shareware" programs for doing this. However, some high-use sites like Facebook.com and Twitter.com now intercept and shut down web crawlers and provide their own proprietary interfaces. These interfaces either throttle access down to lower speeds and/or charge for usage of these interfaces.

An unresolved legal question is whether denying access to web crawlers may constitute a criminal antitrust and/or restraint of trade violation. However, these violations are not presently on the U.S. Justice Department's priority list of laws that they actually enforce, leaving Internet companies in a situation where they must "self-help" to defend themselves from such activity The expedient of distributing the crawling of these sites over the many individual representatives of the various manufacturers offering products easily subverts all presently known methods of detecting this sort of crawling activity. Each representative's computer would only have to access a few pages from each of these sites and forward them to a central site for aggregation and analysis. The central site could then crawl sites like Facebook and Twitter without being detected.

Crawlers have long used multiple computers to increase performance, but not other people's computers that are widely distributed and each with their own assortment of cookies. This will hide the nature of the crawlers.

A new method of parsing the natural language content of the Internet, faster than prior art methods to make it practical to "understand" everything on the Internet enough to sell products, is the "glue" technology that makes the present invention possible.

Prior Art Natural Language Processing: Many textbooks have been written about Natural Language Processing (NLP), keeping pace with its evolution and development since the original Eliza program by Prof. Joseph Weizenbaum in 1966. NLP methods now vary widely depending on the goals of the program, e.g. searching, identifying content domain, full "understanding," identifying symptoms, transcribing speech, translating text to other languages, and so forth. What has been wanting to date is a way to identify which of many known potential needs, wants, problems, symptoms, pains, expenses, etc., a user has stated or implied, so it can then be determined which products might best satisfy those needs and wants. In most cases the needs and wants will be expressed in first-person statements, notable exceptions being statements related to prospective purchases for Christmas, birthdays, etc., when the text author may be shopping for gifts. It is also necessary to ascertain the pertinent time (e.g. has this come and gone, is it anticipated in the future, etc.) and multiple negation (a language phenomenon largely restricted to English). In short, what is needed to handle complex marketing requirements is relatively simple in comparison to some other NLP applications, like language translation.

The methods embodied in ELIZA live on in present-day chatbots—experimental programs that mimic human conversation. They also live on in DrEliza.com, written by the present inventor to find solutions for chronic illness problems.

One thing that nearly everyone notices when using NL processing programs, like chatbots and language translators, is the time it takes for the programs to prepare responses. It takes a lot of computation to process natural language. Even on modern multi-gigahertz processors most NL processing programs are "trimmed" to eliminate non-essential computations to make them run fast enough to not be objectionably slow, albeit at some cost in accuracy and at the cost of eliminating some less-important analysis.

It is the primary goal of the present invention to greatly accelerate NL processing speed so that Internet providers, like Google.com and Yahoo.com, can more intelligently respond to their users, speeding processing enough that rules can be incorporated to perform as well as is practical, without significant regard for the amount of processing needed to operate that fast.

The Eliza approach is good at solving problems, but is not suitable for answering questions. Sales involve problem solving of a special nature, where the only solutions available are the products that are available for sale. In problem solving, all a computer must do is recognize particular problem situations where the computer can render good advice, while ignoring all other input. To illustrate, to recognize a situation where it may be possible to sell a hybrid electric car:

| Statement Qualifying a Prospect | Statement Disqualifying a Prospect |
|---|---|
| Is this about the author, e.g. written in the first person? | Does the author already have an equal or better solution in hand, e.g. mentioning "my Honda Prius" |
| Has the author recognized that he/she has a problem, e.g. with words like "can't," "cannot, "won't," "will not," etc.? | Has the author said something suggesting that he doesn't have the money to purchase, e.g. mentioning "my food stamps"? |
| Has the author mentioned a problem that is addressed by a represented product, e.g. "poor gas mileage"? | Is the author already aware of the product, e.g. by mentioning it by name? |
| Can the author afford the represented product, e.g. has he mentioned "my job." | Is the author aware of problems that this product has, e.g. mentioning the "high cost of hybrid cars"? |
| Is this a current problem, e.g. is it written in the present imperfect tense? | |

This is a much deeper analysis than prior art methods of simply looking for the use of certain words to trigger the display of advertisements without regard for the context in which they are used.

Simplistic NL processing was done crudely in the original Eliza, and elegantly in DrEliza. There is a barrier common to nearly all NLP development efforts that limits NLP performance. The more statement elements recognized, the more time is needed to test for all of them, wherever they might occur. NLP projects have therefore had to strike a compromise between functionality and speed that falls several orders of magnitude short of functioning as a useful component in analyzing the entire Internet in real time.

The present invention provides a way to sidestep this barrier, so that much deeper analysis can be performed without significantly slowing the program down. Program speed is nearly unaffected by the number of statements that can be recognized. Hence, it becomes possible to deeply analyze the semantics of statements to determine what is being said and implied, while handling the data nearly as fast as it can be brought into memory. The potential applicability of this new methodology goes far beyond the presently used methods.

There are other prospective methods for doing the searching part of this NLP, e.g. Google.com could conceivably do this if it could accept very complex search strings that would be thousands of characters long, rather than the present 10-word limit. The methods used at Google.com are simply too inefficient to ever build a business model around doing the same things the present invention seeks to do, even if Google were to open up the Google.com interface enough to allow some such queries. Google.com is also missing other essential capabilities, e.g. metadata extraction, most notably the extraction of contact information.

The performance barrier has constrained NLP for the last 40 years, as various developers have sought various ways to process more efficiently without really addressing the fundamental limitations of this barrier. An example is the method commonly used in some automatic spelling correction programs, where chains of misspellings having the same first two letters are maintained in order to shorten the searching. This runs fast for spelling correction, but not for anything else. Google has attempted to resolve the problem simply by dedicating large buildings full of computers at the barrier. That it has taken 40 years to conceive a way past this barrier should resolve any issues concerning "obviousness" under the patent laws.

The natural language processing part of the present invention functions similarly to state of the art "chatbots"—programs that carry on a running natural language conversation with users. These programs are sometimes created as part of "Turing test competitions" to determine which best mimic natural human conversationalists. Some of the principles used in the present invention are similar, but the objective and the advantages are different than those of chatbots. Specifically, chatbots are designed to mimic and maximize conversation, but the present invention, like its predecessor DrEliza.com, is designed to minimize conversation while providing maximum informational value. The present invention will thus produce no response to the vast majority of Internet postings.

Moreover, chatbots are not designed or expected to be useful. In contrast, the entire purpose of this invention is to be more useful and more valuable than competing advertising methods.

Still further, chatbots are designed to emulate human conversation. However, when responding to intercepted email contents and other private conversation this can be a very disadvantageous, as it causes users to suspect that their email conversations are not private. When responding to intercepted private communications, the output must not appear to be human-sourced. It would be advantageous, therefore, to be able to customize a generic-looking advertisement to the specific intercepted conversations.

And further still, chatbots may require a second or more to process a simple statement and produce a response, whereas the presently inventive system must analyze much more deeply, process much longer postings, and produce responses without consuming more than a few milliseconds of time in order to keep up with the Internet. This requires 3-4 orders of magnitude more speed.

Finally, like most AI programs, NLP programs are almost always table driven.

The background discussion, including consideration of the known prior art systems and methods, reflect the current state of the art of which the present inventor is aware. Reference to, and discussion of, these known systems and methods is intended to aid in discharging Applicant's acknowledged duty of candor in disclosing information that may be relevant to the examination of claims to the present invention. However, it is respectfully submitted that none of the background art discloses, teaches, suggests, shows, or otherwise renders obvious, either singly or when considered in combination, the inventive method described herein.

BRIEF SUMMARY OF THE INVENTION

The present invention is an advertising tool that grammatically analyzes forum, blog, and social media postings from all over the Internet, and based on the results of the analysis produces personalized replies containing useful information that apparently come from another Internet user. The goal is to convert "push" into "pull" advertising by providing just enough information to describe products to potential buyers who have expressed a clear interest, and convert their interest into a discussion with a sales technician, which would initially be a human, but which may eventually be an AI software agent.

Nowhere is the present invention more effective than in advising and promoting social, ethical, religious, and political positions, and in recommending effective actions in conflict situations. This is for several reasons: First, the decision to "buy" (to perform and act or to do something) has already been made. Second, the prospect can be approached at the objection-elimination phase, bypassing the earlier phases of a sale. Third, applicable sales situations can often be detected within a single sentence.

For example, suppose someone posted, "I just lost my job." This might be answered with an advertisement reciting something like, "Had the nation been on 30-hour instead of 40-hour workweeks, you would have another job waiting for you. The 40-hour workweek was instituted during the Great Depression and is now obsolete. If you aren't voting for candidates who are promoting a 30-hour workweek, then you are digging your own hole. First rule of holes: When you find yourself in one, stop digging."

Immediate action can also be advised, e.g., suppose someone were to post, "I'm never going to speak to him again." This might be answered with "The ancient and wise Chinese philosopher Sun Tsu once said to keep your friends close, and your enemies closer."

This is most effective when there is a healthy mix of unpaid informational replies and paid promotional replies. It is very important to maintain the credibility of all information provided, so great care is needed not to exaggerate promotional material.

Note that the output of an AI system can also be a valuable source of material for response. In the above example, various religions might protest the acceptance of others as enemies or the idea of keeping enemies close. Some religions might even encourage their adherents to pay to express their beliefs in opposition to recommendations made by AI, probably citing chapter and verse of their own religious writings.

This deeper analysis to produce dissenting opinions can be easily accomplished by reprocessing the AI output as its own input. Reprocessing can be repeatedly performed until nothing new is added, thereby fully wringing out the subject from all perspectives. In this example, Sun Tsu's teachings would be provided for free, and advertising fees would be collected from the various religions taking exception to Sun Tsu or to one another.

The 37th U.S. President, Richard Nixon, pioneered the practice of bringing up divisive wedge issues to weaken his adversaries. This practice now brings in billions of dollars of advertising revenue every election cycle. However, an AI need not wait for political candidates to raise and advance often irrelevant wedge issues. An AI can apply ancient wisdom to manufacture endless divisive wedge issues on-the-fly in responses to postings. An AI can instantly proceed to wring issues out, while collecting advertising fees from all those who promote various positions.

The present pay-for-votes U.S. political system is predicated on the present tenuous information channel between special interests and voters via advertisements. Refinement of that channel by appropriately responding to voters' comments will demand that various positions be defended when challenged to avoid outright losing the associated votes. An AI acting as a "troll" by introducing wedge issues could make the potential cost of failing to respond very high.

Human intelligence guiding artificial intelligence could potentially steer almost any discussion to address wedge issues. Bleeding the present pay-for-votes U.S. political system may force a reform of that system, and as a result limit the income from the present invention, though that may be highly desirable at the broader social level. However, if a political reform fails to materialize, the wealth of the richest nation on earth will continue to be expended to argue over mostly irrelevant wedge issues, to the considerable benefit of the owner of the present invention.

As another example related directly to more conventional advertising, suppose General Motors was a customer of the provider of services embodiment in the present invention, and GM wished to sell their Volt electric cars. That provider would contract with a sales technician who already owns a Volt, or have GM provide a Volt to a selected sales technician. The inventive system might scan the Internet for people who were complaining about the high cost of gasoline, and prepare personalized first-person replies to them from our sales technician, who would then conduct continuing conversations with them as needed. The provider's sales technician would confirm that the replies were to apparently valid prospects before the automated replies went out, to avoid "push" messages to people who weren't legitimate prospects. A reply would contain a message like: "I saw from your Facebook posting that you 'are being killed by the cost of gasoline.' I've been driving a Volt for the last year and I haven't had to purchase a tank of gas since I bought it. Take a look at http://www.GMcom/volt for more information, or just email me back."

Language Granularity: There are seemingly endless ways of saying the same things. However, on close scrutiny, after compound sentences are chopped into separate simple sentences, the subject, verb, and object phrases are isolated, the negations resolved, and time is identified, there remains only a small number of ways that each phrase might have been said to convey the same meaning. Then, it becomes a simple matter to simply list the potential interesting phrases leading to a particular action.

In DrEliza.com, this is done with a very advanced regular expression analyzer, capable of evaluating whether a particular variable sequence of words is present. Then, when the results of the regular expression analysis have been completed, a logical analysis is made of which interesting combinations occurred. This identifies what it is that the user doesn't know that led him to express his problem in the particular way that he did.

Every word has an assortment of potential meanings and implications. Saying exactly the same thing differently is usually impossible because every word has a different "inheritance." Hence, the more ways identified for saying the same thing, the more varied the meaning becomes, until it crosses a line and means something else, something unintended.

As a result, it is usually impossible to produce an exact language translation, because the words in each language have developed slightly different meanings. The best that language translation can do is to provide the nearest practical meaning, and then to provide footnotes where the error is significant. As an example of the best translation of something that is humanly possible, consider one of the translations of the Koran (samples of which are available for free via Amazon's Look Inside feature). There, the footnotes explain that the differences between the best English translations and the stated meaning in Arabic are about as long as the English translations themselves.

A similar phenomenon occurs in computational linguistics where words have "meanings" conferred on them by the rules used to process them, which are usually at slight variance with common usage. Hence, what the computer sees is often a little different from what the author intended.

Examples Illustrating the Ramifications of Word Choices: When examining what people write for "tells," it is important to gather each of the critical bits of information. For example, before pitching a new car it must be determined: (1) Are they talking about their car? (2) Are they complaining about something that is fixed best with a particular new car? (3) Is there an easy fix for their present problem, so they don't really need a new car? (4) Do they have any money to purchase a new car? (5) Is their credit any good, e.g., have they made other major purchases lately? (6) Is there anything indicating what sort of a new car would be best for them? (7) Are there any "tells" as to what kind of communications they prefer, e.g., analytical or synthetic, right brain or left brain?

The trick for achieving reliability from the fundamentally unreliable process of computational linguistics is to confirm points that appear to be minimally necessary for a response to be valid, even though those points are not needed to form the actual response. This was one of the discoveries made in in the process of making DrEliza.com work.

For instance, in the locution: "The price of gas is killing me," the user might be referring to natural gas for the home, so a reference to an automobile is still needed before trying to sell him a better car.

And in the locution: "I can't afford gasoline," there is the implication that gasoline is much too expensive, so that an electric car might be a better product to offer than a gas saver. This could also imply that the user has no money.

But in the expression: "I can no longer afford gasoline," the implication is that in the past the person was able to afford gasoline, so perhaps they don't need a radical change, but just a car that uses less gasoline. This could also be the result of the user losing his or her job.

But in the expression: "Fuel is too expensive," one is left to wonder, what kind of fuel? This could be for their home, truck, or car. Alternatively, this could be a political statement or a comment about the impact of fuel consumption on the environment.

In an expression such as, "My car is bankrupting me," there is ambiguity: bankrupting him how?—repairs, gas, accidents, or what? He probably needs a new car, but there is no hint of what kind of new car might be best.

In the locution: "I need to switch jobs because of the price of gas," we can see that he has a job, is employable in other jobs, and probably needs a car that uses less gasoline. Alternatively, he might be a good customer for an employment agency, or he may be sarcastically commenting on the manipulation of gas prices by oil companies.

Then again, in the expression, "The Arabs are stealing my money," we find an evidently socio-political statement that may have nothing to do with fuel of any kind. If the author truly needs a new car, it will have to be determined from other sentences.

Converting Words to Ordinals: Natural Language processing has been done via character manipulation. However, the present invention involves a step of converting English words to ordinal values, which makes processing orders of magnitude faster, not because integers are so much faster than strings (which they are), but because simple indirect addressing can immediately access everything known about a word. This can then be leveraged to provide even greater speed by only considering the rules that apply to the least frequently used words, as explained below.

DPFP Hashing Used to Make Ordinals: There has been much development over past decades on improved hashing methods, where output changes wildly and randomly with any change in input. However, the methods used in the present invention are much faster—but lower in quality in the sense that changes in input tend to produce "clustered" results. The input to this routine is the result of a low quality hashing algorithm. The first thing the routine must do to avoid incurring processing overhead associated with clustering is to "de-cluster" its input through a multiplicative randomization process similar to that used in a congruence-type random number generator.

Programmers have long sought to utilize floating point arithmetic to perform complex logical operations, because these operations do a lot and they are about the same speed as 64-bit integer operations on modern computers, once the time needed to access the operands is factored into the consideration. One common prior art example is adding 0.0 to a string of bits, thereby causing the floating point normalization hardware to shift the bits to the left until the first "1" bit appears in the leftmost position. The decrease in the exponent then indicates the location of the first "1" bit.

The present invention utilizes double precision floating point (DPFP) arithmetic (of 64 or more bits) to thoroughly scramble (hash) information over a large number of bits, and do it more quickly than has been done in the past using integer arithmetic. The only advantage to this method is its speed, which is important for the immediate application as it requires all of the text on the Internet to be hashed.

"Whiteness" is the measure of quality in hashing methods. Whiteness is somewhat like "randomness." However the result of arithmetic operations is never random. Instead, it means uncorrelated results and not clustered results, so in a perfect method any change in the input produces a wildly different result. This is especially important when hash values are subsequently used as subscripts into a large hash table. Clustering slows programs by adding additional steps to deal with "collisions" while searching for specific entries.

With integer arithmetic, care must be taken not to cause an overflow. On most computers this triggers hardware integer overflow exception handling that complicates and slows execution. Complex programming measures are needed to avoid these problematic hardware integer overflow exceptions.

However, with DPFP arithmetic, hashing constants less than 1.0 can be chosen. Then, instead of overflow exceptions, low bits are dropped off of the least significant ends of the numbers as hash values are accumulated, which causes no such problematic hardware exceptions. There is no need for the usual programming required to avoid these exceptions, thereby increasing speed.

The Internet as a Seemingly Intelligent Entity: There have been various specific proposals for the creation of an intelligent Internet, most notably the one by Matt Mahoney entitled, A Proposed Design for Distributed Artificial General Intelligence. As noted above, in the speculative article, Could the Internet Ever "Wake Up"? Christof Koch and Robert Sawyer explore the prospect of the Internet becoming conscious. There have been two fatal defects in all such prior proposals: (a) they require active participation by users, when no one wants to be treated as a "prospect"; (b) there is no transitional path from spam-generator to becoming a useful assistant. Once the initial defects in these systems show them to be an apparent spam generator, the output from these systems would be routinely intercepted and destroyed regardless of how "smart" they might become.

The common need to "sell" an answer by demonstrating that the program "understands" what the user is seeking strikes at the very heart of all sales efforts. Prospective customers are not interested in generic sales pitches, but they are quite interested in statements that are in direct answer to their own stated needs. If all sales worked in this way and sales efforts were directed only to people whose needs could be reasonably inferred from their own statements as paraphrased back to them, then prospects would (or arguably at least should) avidly read every sales-related communication.

To make this work in the present world despite initial defects, spam filters, and so forth, two things are needed: (1) human review and interface, so that the messages appear to be coming from people instead of a computer program, and people actual ready to field any responses to them; and (2) some means of evading all known or easily developed means of interception, at least for a time sufficient for the technology to mature. Both are easily accomplished by routing all outgoing communications through the personal email accounts of the representatives to whom recipients of communications would be directed and urged to contact. By opening up the opportunity to represent products to thousands/millions of users, (semi)automated messages could no longer be recognized by their origin, and the grammar would be better than average emails. The emails would quote statements made on and through the Internet by their recipients so they would be very personalized—perhaps more than much of the present non-spam traffic. By randomly mixing up the phraseology, messages could not be compared to see if they were all saying the same things. By carefully identifying prospects, there would not be enough daily traffic to alert spam filters.

This provides a smooth development path, starting with substantial improvements to current Internet search engines, through a period where humans cover the idiosyncrasies of the emerging system, to a period where most Internet communication will use a central AI that reads and "understands" everything. Responses occur wherever a response is needed, regardless of whether the user is suffering from some illness whose cure has just been discovered on the other side of the world, or simply needs to replace a current automobile in favor of something better, once it has determined the user's habits and needs.

The Mobile Device Problem: The predominant development most discussed in the boardrooms of the major Internet players is mobile device technology. Many users, particularly social network users, now perform the majority of their Internet usage using mobile devices, like cell phones. The problem with mobile devices is that they have small screens—large enough for most applications, but not large enough to cover with flashy advertisements. This now threatens the very survival of several major Internet companies that make a living from advertisements but are losing revenue streams from these customers.

Complicating this situation is new ad-blocking software many users now utilize to avoid having to page past countless ads sent to their cell phones. As this software spreads, revenue diminishes even further. Further complicating this is the mobile device browsers that have opted not to support Adobe Flash, an essential component in aggressive advertising.

Moving away from "push" advertisements to an AI approach that generates "pull," the present invention also solves the mobile device issue by working in carefully crafted acceptable messages, rather than undesirable ads.

The present invention is characterized in its most essential aspects by the following method steps:

(1) Associating rules with their least frequently used word(s): This reduces by orders of magnitude the number of rules that need to be evaluated. This preferably involves the use of ordinals, which is estimated to provide approximately 1000:1 or more of a speed advantage over present methods.

(2) Performing natural language processing with ordinals instead of strings: This probably speeds up Natural Language Processing by approximately 10:1. Some proprietary search engines likely work with ordinals, but they do not perform high level NL processing. Revamped search engines may be able to present some competition to this technology.

(3) Floating point hashing: FP hashing probably offers a ~2:1 speed advantage over the best non-FP methods. Using floating point hashes in lieu of the strings that created them to confirm the strings, and simply accepting the one-in-a-million chance of an inconsequential error to greatly speed up the processing. This probably produces a ~20% increase in speed.

(4) Confirming more points than are necessary to form a response. This corrects for the all-too-common "false positives" in the computational linguistic analysis of natural language, to avoid sending messages to uninterested people. This probably reduces the false positive rate by ~10:1, from being the majority of the "hits," to being just a minor residual problem.

(5) Driving an email engine with the output from AI analysis of the web, plus putting a human in the loop to make sure that the messages look like they are from a human. The business process of using site members as sales representatives. They work on commission.

(6) Web crawlers accessing the Internet via representatives' computers. This completely hides their operation, thereby defeating all known anti-crawler approaches. Linking different web crawlers together through a common data interface will enable the crawling to proceed across protected domain boundaries, such as in and out of Facebook.

(7) Providing a common interface to all types of natural language processing rules. This allows them to be freely intermixed despite differences in type of analysis or scope of analysis. With this, once the "engine" has been programmed, extensions to processing will require no further computer programming.

The foregoing summary broadly sets out the more important features of the present invention so that the detailed description that follows may be better understood, and so that the present contributions to the art may be better appreciated. There are additional features of the invention that will be described in the detailed description of the preferred embodiments of the invention which will form the subject matter of the claims appended hereto.

Accordingly, before explaining the preferred embodiment of the disclosure in detail, it is to be understood that the disclosure is not limited in its application to the details of the construction and the arrangements set forth in the following description or illustrated in the drawings. The inventive method described herein is capable of other embodiments and of being practiced and carried out in various ways. The fundamental aspects of the invention, along with the various features and method steps that characterize the invention, are pointed out with particularity in the claims annexed to and forming a part of this disclosure. For a better understanding of the present invention, its advantages and the specific objects attained by its uses, reference should be made to the accompanying drawings and descriptive matter in which there is illustrated the preferred embodiment.

BRIEF DESCRIPTION OF SEVERAL VIEWS OF THE DRAWINGS

The invention will be better understood and objects other than those set forth above will become apparent when consideration is given to the following detailed description thereof. Such description makes reference to the annexed drawings wherein:

FIGS. 3A and 3B collectively comprise a block diagrammatic flow diagram showing NLP data structure;

FIG. 4A is a block diagrammatic flow diagram showing the inline hash subroutine;

FIG. 4B is a block diagrammatic flow diagram showing the output subroutine in which text is tokenized and converted to a list of ordinals;

FIG. 6 is a block diagrammatic flow diagram showing how the hashing logic uses floating point arithmetic.

DETAILED DESCRIPTION OF THE INVENTION

Figure 1:
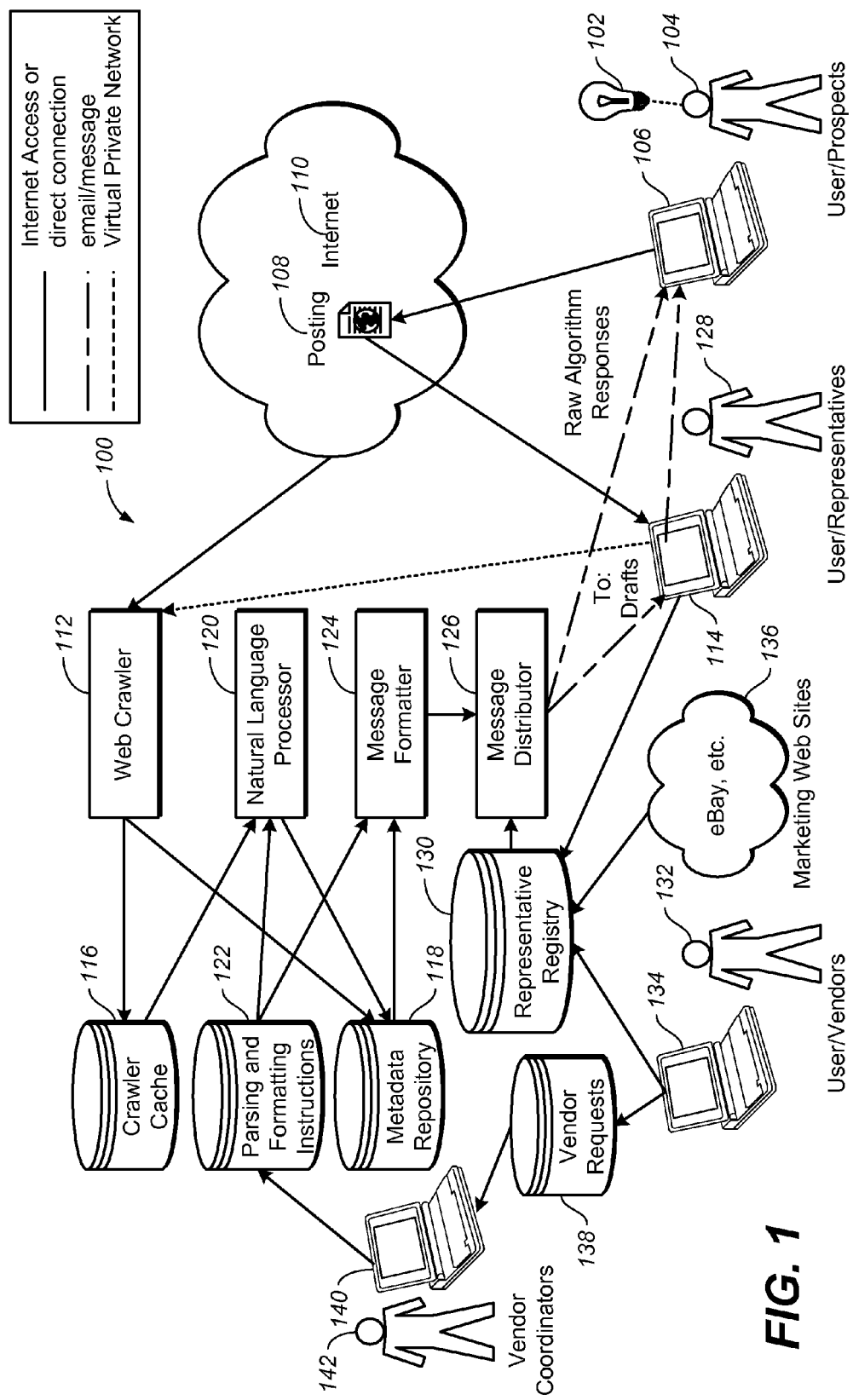
FIG. 1 is a highly schematic diagram showing the overall information flow.

Glossary: Before proceeding to a detailed description of the preferred embodiments of the present invention, note should be taken of the meanings of the following terms and phrases as used herein:

buy: as used herein, "buy" means accepting a proposition that someone else is selling, e.g., purchasing a product, taking an action, believing in something, etc.

character manipulation: as used herein, "character manipulation" means prior art natural language processing programs often operated by examining and manipulating the characters in their input. The present invention does not utilize character manipulation, except in some rare instances.

chatbot: as used herein, "chatbot" means a computer program that carries on a natural language conversation. ELIZA was the first chatbot.

circular array: as used herein, "circular array" means an array of values arranged in a circle, where the next entry after the last entry is the first entry, and the entry just before the first entry is the last entry. These are common in symbol tables, where random access leads to a point in the table, and the computer examines successive entries until the desired entry is found, without concern for hitting the end of the table.

common data interface: as used herein, "common data interface" means a single interface between many different modules or programs, so that they can exchange data with each other without regard for the peculiarities of their individual situations. EDIFACT and X.25 are widely used common data interfaces.

computational linguistics: as used herein, "computational linguistics" means a branch of linguistics that develops heuristic analysis methods designed to work much/most of the time, without concern over imperfections.

drivel: as used herein, "drivel" means data that, from an information theory point of view, contains no useful information. There are three types of drivel: data that is worthless to everyone, e.g. bad jokes, an unknown stranger's picture, etc.; data that may be valuable to someone, but which is of no interest to the present user; data that is of interest to the present user, but is better presented elsewhere.

ELIZA: as used herein, "ELIZA" was the very first natural language processing program, written in 1966 by Joseph Weizenbaum.

false negative: as used herein, "false negative" means when something is stated, but a natural language processing program fails to recognize it. This often happens with complex sentence structures that the computer can't correctly "unwind", and with unanticipated statement structures. Fortunately, people often supply important facts in several places using different words as they describe the details of their situations, so the overall false negative rate is considerably less than the false negative rate for individual sentences.

false positive: as used herein, "false positive" means when a natural language processing program has erroneously recognized something, but that thing was not stated. Often, some irrelevant statement is misunderstood by a computer to be something important. In prior art systems that only look for the presence of key words, false positives far outnumber correct recognitions. False positives are responsible for the large number of misdirected advertisements that now clutter the Internet.

Floating-point hashing: as used herein, "floating-point hashing" means a fast method of hashing that uses floating point computations to avoid having to program measures to avoid numerical exceptions.

fuzzy logic: as used herein, "fuzzy logic" means heuristics to compute with probabilities that are presumed to be correlated. For example, one approximation for the OR of two correlated probabilities is the maximum of the two probabilities.

hashing: as used herein, "hashing" means scrambling and randomizing characters in a word to form a number that is uncorrelated with any of the characters.

heuristic: as used herein, "heuristic" means makeshift coding.

identifiable prospects: as used herein, "identifiable prospects" means people who could effectively use something you have, whom you can identify.

Integer arithmetic: as used herein, "integer arithmetic" means arithmetic performed on whole numbers. Fractions are either lost or must be recovered as remainders. Overflows cause numerical exceptions that slow execution. High quality hashing algorithms that produce the best results use integer arithmetic, but high quality hashing techniques are too slow to use for hashing all of the text on the Internet.

intelligent Internet: as used herein, "intelligent Internet" means the present invention embodies one of several visions for a future Internet that functions like an intelligent expert assistant. The vision behind the present invention works within the existing Internet to wait until it sees that a user needs something about which information or the thing sought can itself be provided through the Internet, and provides whatever it is that the user appears to need.

language granularity: as used herein, "language granularity" refers to the fact that a limited assortment of words can only be arranged in so many ways, which severely limits the range and detail of things that it is possible to say. These points of possible meaning in a vast sea of things that cannot be said are different in each human language, and are radically different in computers, making correct translation impossible, except in some rare instances. This phenomenon severely limits the prospects for human-level machine understanding.

least frequently used word: as used herein, "least frequently used word" and/or "LFU" means the word(s) in a rule that must be present for the specified syntax to be present. Where there is more than one candidate word, the one that is least frequently used in natural language is selected. This obviates execution of the rule unless the parts that are most likely to be absent are known to be present.

list structure: as used herein, "list structure" means elements in a list have pointers that point to the next and/or previous elements. This facilitates inserting and removing elements without having to move unaffected elements.

lurking: as used herein, "lurking" means watching internet discussions without responding, until just the right postings appear to enter the discussion.

machine understanding: as used herein, "machine understanding" means translating natural language into an internal machine representation of the semantics of what was stated. This is severely impaired by granularity of both the language and the machine, and the lack of any useful way of internally representing most of what people say.

multiple negation: as used herein, "multiple negation" means double negation and other instances of multiple negation allowed in all languages that allow for multiple negative indications in a sentence. Such indications may be separate words, word prefixes, word selection, and so on. Most languages treat any number of negative indications the same as if the sentence had a single negative indication. However, in English, an even number of negative indications counts as a positive indication. This brings sensitivity to perceived meaning-reversal wherever a negative indicator fails to be recognized. This is further complicated by idiomatic double negation, e.g. "ain't no" conveying only a single negation.

multiplicative randomization: as used herein, "multiplicative randomization" means multiplying an argument by a constant that contains several irregularly spaced bits, so that the argument is added to itself shifted in several different positions, and then selecting a central portion of the product natural language: as used herein, "natural language" and/or "NL" means ordinary speech or writing, as opposed to artificial languages, like computer programming languages. This includes typical human errors of all types.

natural language parser: as used herein, "natural language parser" means a program that determines what was said in natural language input.

natural language processing: as used herein, "natural language processing" and/or "NLP" means computers extracting useful information from natural language.

on-demand parsing: as used herein, "on-demand parsing" means prior art methods of evaluating parameters as needed during parsing.

opportunistic parsing: as used herein, "opportunistic parsing" means methods of parsing where rule evaluation is triggered by infrequently used words.

ordinals: as used herein, "ordinals" means sequentially assigned numbers that indicate particular words.

payload: as used herein, "payload" means the new information contained in a sentence, as distinguished from the words that place it in a world model. Often a different world model will see different words as being the payload.

pull advertising: as used herein, "pull advertising" means promoting something to someone who asked you to do so. The challenge is to coerce a prospective customer to ask about your product.

push advertising: as used herein, "push advertising" means promoting something without being asked to do so.

quadratic effect: as used herein, "quadratic effect" refers to the overall false negative rate as a function of the false negative rate of the analyses of individual statements. The false negative rate of two statements that address the same thing is the square of the false negative rate of a single statement. As a result, ordinary inadvertent repetition of facts disproportionately reduces the overall error rate.

queue: as used herein, "queue" means a list of things to be done. Placing rules into queues to be done later when their parameters are all known eliminates the need to evaluate rules on demand.

recursive descent: as used herein, "recursive descent" means a method wherein syntax rules are evaluated by placing the state onto a stack, evaluating a rule, and restoring the state from the stack. Rules may sometimes refer to themselves, which makes this process recursive. Recursion can continue indefinitely, which is the descent part of this term. Computer languages tend to lend themselves to recursive descent parsing, but natural languages are not structured in a way that lends itself to recursive descent.

regular expression: as used herein, "regular expression" means a simplistic way of specifying a particular syntax that lacks the variables and structure of Backus-Naur Form.

rule: as used herein, "rule" means a procedure to perform recognition and other tasks needed to process natural language. Rules are usually written in a custom variant of Backus-Naur Form.

scope: as used herein, "scope" means the amount of text being considered together. A scope can be a word, phrase, sentence, paragraph, or posting.

search engine: as used herein, "search engine" means a program that searches the Internet for messages containing particular words without concern for their context and without the ability to answer questions or solve problems.

sensitive website: as used herein, "sensitive website" means a website with mechanisms to detect and block web crawlers.

SPAM: as used herein, "SPAM" means unwelcome messages promoting something. The challenge is to select recipients and tailor messages to them so that messages will be welcomed. Messages not wanted by recipients are considered to be SPAM.

SPAM filters: as used herein, "SPAM filters" means software that intercepts advertising and suppresses presentation to the user.

sell: as used herein, "sell" means successfully convincing someone to feel, believe, or do something, e.g., to purchase a product, take some action, believe something, etc.

statements of ignorance: as used herein, "statements of ignorance" refers to the fact that everything said is necessarily interwoven with a model of the part of the world in which the speaker/author exists. All models are incomplete, and most models contain errors. It is impossible to avoid displaying one or more models as part of what is said, and in so doing we display ignorance of certain aspects of how the world works. Detecting these errors is crucial to solving people's problems.

strings: as used herein, "strings" means sequences of characters that form words, sentences, paragraphs, and postings.

sub-condition: as used herein, "sub-condition" means malfunctions, especially in animals and humans but also frequently in machines. Malfunctions are often categorized into various "conditions" according to their presentation. However, careful analysis usually shows that each "condition" is actually an assortment of several different sub-conditions, all of which happen to exhibit a condition nearly identically. Any AI performing useful diagnosis must be able to deal effectively with conditions having numerous sub-conditions.

subroutine: as used herein, "subroutine" means some computer code written to handle a particular situation.

substring: as used herein, "substring" means a portion of a string, often extracted with Left, Right, or Mid operations to extract characters from the left, middle, or right of a string.

syntax: as used herein, "syntax" means the arrangement of words and phrases to create well-formed sentences in a language.

syntax equation: as used herein, "syntax equation" means specification of syntax in equation form. The most common syntax equation form is Backus-Naur Form.

synthetic user: as used herein, "synthetic" means a computer program that acts like a user to accomplish some purpose.

tells: as used herein, "tells" means subtle indications, contained in word choices and phrase structure, of meanings not explicitly stated.

token: as used herein, "token" means an extracted linguistic element such as a word, number, or punctuation character.

troll: as used herein, "troll" means an entity producing responses calculated to provoke readers to redirect discussion in directions of the troll's choosing. This is most effectively done by lurking until someone makes a posting that can be responded to in a way the redirects discussion.

user: as used herein, "user" means someone, or an AI synthetic user, who uses the Internet.

user/representative: as used herein, "user/representative" means users who work as representatives to facilitate transactions and other activity.

web crawlers: as used herein, "web crawlers" means programs that automatically go from web page to web page, gathering information to be analyzed.

whiteness: as used herein, "whiteness" means the quality of apparent randomization, so that results are uncorrelated with input and are unclustered.

wrapper: as used herein, "wrapper" means code that encapsulates other code to enhance its operation in some way.

Referring now to FIGS. 1 through 6, wherein like reference numerals refer to like components in the various views, there is illustrated therein a new and improved method of analyzing text found throughout the Internet so as to identify potential purchasers of products and services. The system identifies only those who have expressed a clear interest in needing a solution. When such a person is identified, the system fashions a personalized reply containing enough pertinent and useful information about a potential solution to the expressed need, product or service, wherein the replies appear to come from other Internet users, thus facilitating a connection between a sales technician (real or artificial) who would carry through in the effort to meet the expressed need.

Referring first to FIG. 1, there is shown the overall information flow within the inventive system. A problem, need, or want 102 becomes apparent to user/prospect 104, who uses his computer 106 to post 108 it on the Internet 110. Soon a web crawler 112 reads the posting, either directly, or through a bidirectional private connection (e.g. VPN) and special software in the user/representative's computer 114 to access the web while appearing to be operated by user/representative 128, to subvert sites like Facebook.com and Twitter.com that attempt to restrict web crawlers. Web crawler 112 then files the posting in the crawler cache 116. As the web crawler 112 discovers metadata, like the name or email address of the user who made the posting 104, it stores the metadata in the metadata repository 118 to later be combined with other metadata discovered by the natural language processor 120.

The natural language processor 120, following parsing instructions 122, reads postings from the crawler cache 116, extracts metadata about the posting and the user/prospect 104 who made it and stores the metadata in the metadata repository 118 along with any other metadata that was put there by the web crawler 112.

The message formatter 124 formats the metadata in the metadata repository 118 according to formatting instructions in the Parsing and Formatting Instructions cache 122, and routes the message to the Message Distributor 126, which determines the preferred method of delivery. This delivery could be via a specially marked draft email that would appear in a special folder on a user/representative's email system with the markings removed, the user/representative shown as the originator, and the final recipient shown as the destination, to be approved by the user/representative 128 before forwarding it via the Internet on to the user/prospect's computer 106 or forum receiving the response, as though the user/representative was the original source of the message. This delivery could also be directly via email from the Message Distributor 126 to the user/prospect's computer 106 when the natural language processing and message formatting has matured sufficiently.

To create and coordinate the Internet as a sales force, Vendors 132 via their computers 134, and automated sales mechanisms like eBay 136, post their needs for user/representatives to assist in selling their products on a representative registry 130. User/representatives 128 via their computers 114 access the representative registry 130 to identify products that they could represent well, and they register themselves as representatives of those products to either promote those products or classes of products, or in the case of specific articles for sale as is typical on eBay, act as a finder for a "finder's fee."

To program the natural language processor 120 and message formatter 124 for each vendor's 132 needs, vendor 132 via his computer 134 fills out an on-line form stored in the vendor requests cache 138. Vendor requests in the vendor requests cache 138 are manually considered, both individually and as groups of similar and/or competing vendors, to form a set of comprehensive instructions to the natural language processor 120 and the message formatter 124 to identify applicable user/prospects 104, perform any triage needed to restrict what a user/prospect 104 sees, and places those instructions into the parsing and formatting instructions cache 122.

Figure 2:
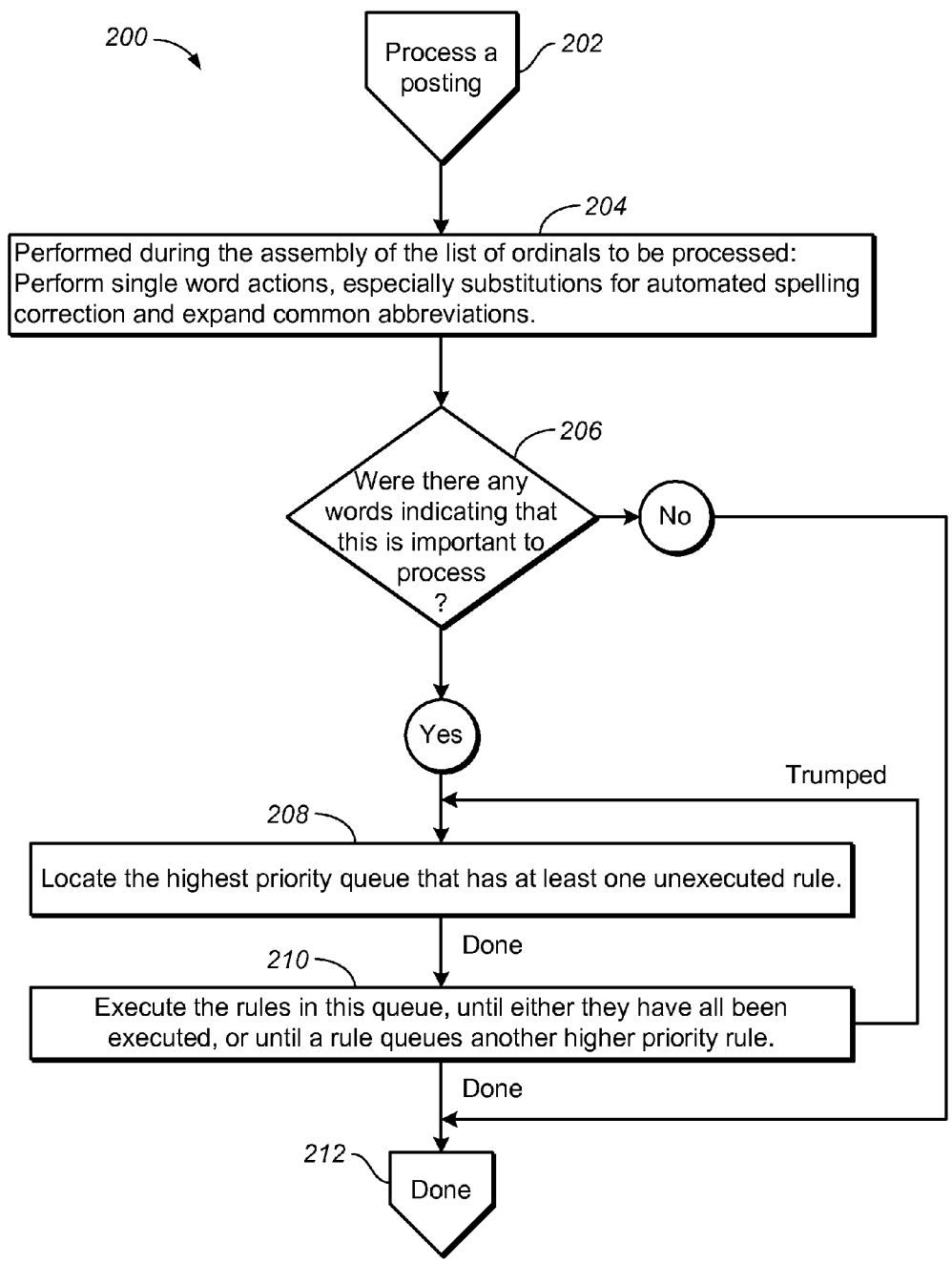
FIG. 2 is a block diagrammatic flow diagram showing the NLP overall flow.

Referring next to FIG. 2, there is shown in block diagrammatic form the NLP Overall Flow of the present invention. Processing starts at 202. The first step in processing a posting is to convert the words in the posting to a list of ordinals 204. An initial test will then be made to see if this posting is worth analyzing 206. Once the posting has been processed in, with ordinals having been assigned in place of words and pointers to rules placed into appropriate queues, processing starts with the highest priority queue having any rules to process. There will be many variances from well-organized processing, as English has many lapses of structure. Each of these steps are performed, rule-by-rule, as part of 208. The end of processing a posting 210 leads to processing the next posting.

Figure 3B:
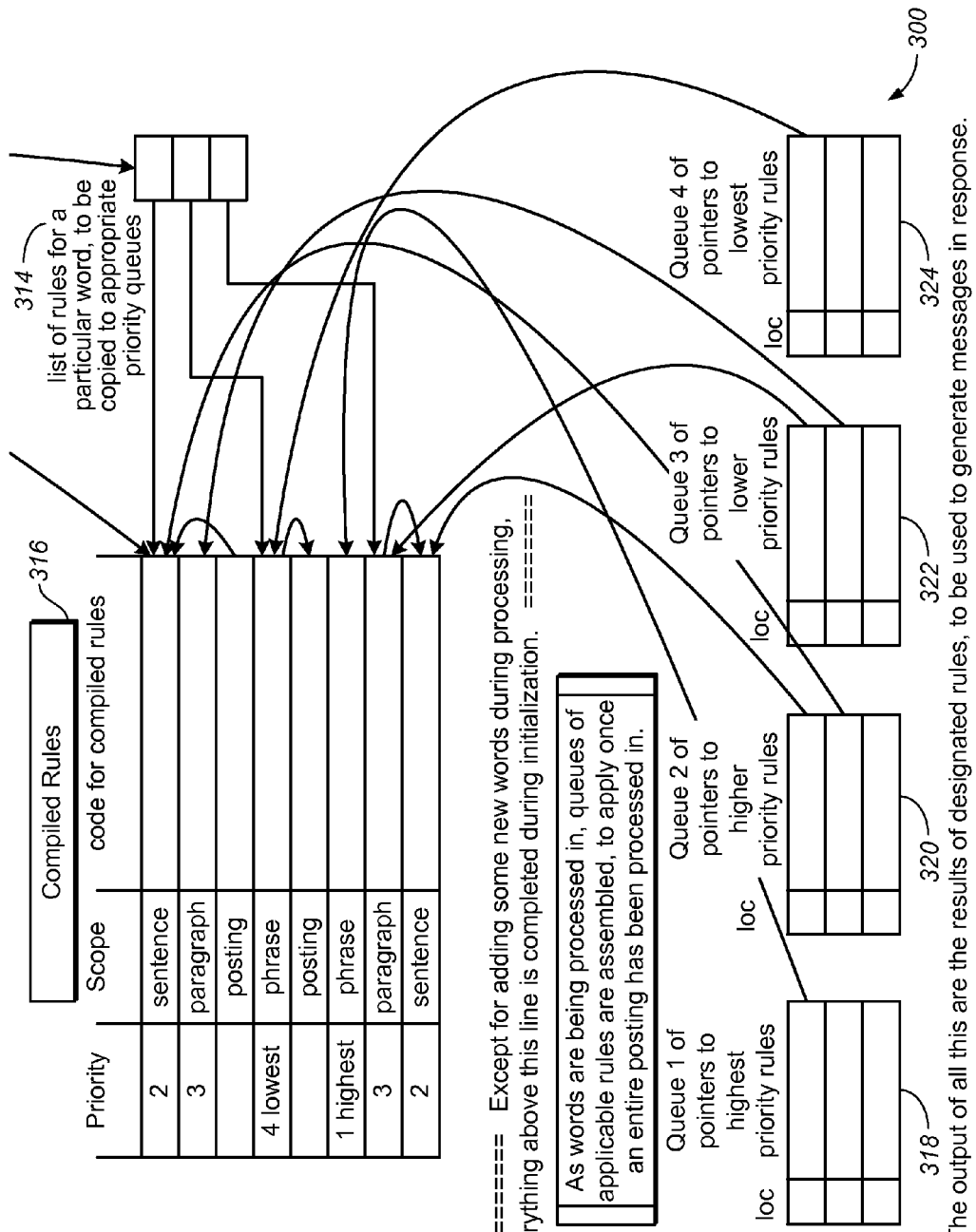

Then, in FIG. 3, we see the NLP data structure used in the present invention. Text to be processed enters 302 and is tokenized as described in FIG. 4 and an ordinal is produced as described in FIG. 5, to produce an ordinal to place in a list 304. Ordinals are then randomized 306 to produce an index 308 into a circular array 310. The circular array contains ordinals that point to lexicon entries 312. Lexicon entries contain their FP hash, the string for the represented word, and pointers either to a rule associated to that particular word 316, or a pointer to a list of rules associated with that word 314.

Rules 316 are each coded with their scope (word, phrase, sentence, paragraph, posting, or user) and priority. When a rule is queued to be executed, the priority indicates which of many priority queues onto which a pointer is filed 318-324, of which only 4 queues are shown. The queues also must know where the word is located that caused the rule to be queued ("loc" in 318-324) because the coding of rules is relative to their trigger-point. When the results of a rule have been determined, it must be filed within the designated scope that the rule appears.

It is up to the implementer whether rules analyze the entire scope within which they were triggered, or are carefully crafted to refer to words relative to their trigger point. Analyzing the entire scope is probably easier to implement, but analyzing relative to the trigger point is probably faster to execute.

Figure 4:
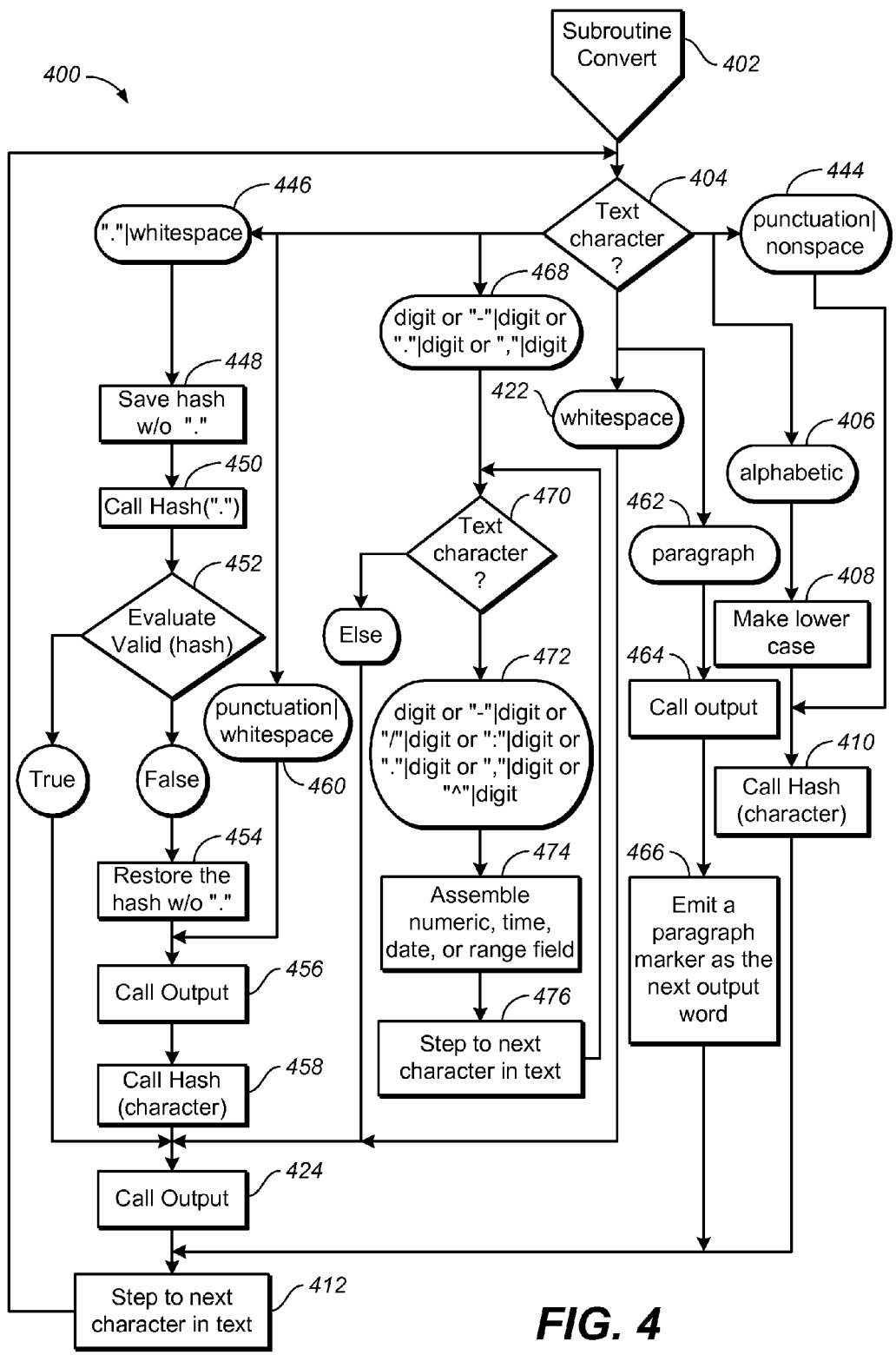
FIG. 4 is a block diagrammatic flow diagram showing how the presently inventive system tokenizes text and converts the tokens to a list of ordinals.

Next, FIG. 4 shows the process 400 for how text is tokenized and converted to a list of ordinals. Text is retrieved from some source, typically a web site using a web crawler, and this subroutine 402 is called to convert the text to ordinals in preparation for natural language processing.

Tokenization is the process of chopping the input into tokens—in the case of English, words. As simple as this process sounds, there are a number of challenges in dealing with abbreviations, dates, times, numbers, and typographical errors.

An index is maintained that initially points to the first character in the text. The indicated character is examined 404 with control branching to various places depending on that particular character and the character that follows it.

If the character is alphabetic 406, it is made to be lower case 408, hashed 410 that calls subroutine Hash at 414, and the index pointer is advanced to the next character 412.

FIG. 4A shows the inline (replicated as needed) hash subroutine 414, which works by first DPFP multiplying the previously accumulated hash by a transcendental number that is a little less than 1.0 416. A good number to use for this purpose is R/4=0.78539816339744830961566084581987572104929234984377 64 . . . entered to as many places as the computer can handle. Then the subroutine's argument character is DPFP added to the accumulated hash value 418, and control returns to the subroutine's caller 420.

If the character is a space, tab, or other whitespace character 422, it ends the present token forcing it to be output 424 that calls subroutine Output at 426, and the index pointer is advanced to the next character 412.

FIG. 4B shows the output subroutine 426, which works by testing if there is a numeric field to be emitted into the output 428, and if so, converting the number to a suitable internal form and emitting the numeric field into the output 430. Note that numbers with allowed mixed punctuation can be simple numbers, exponentials, times, dates, or ranges of any of these.

The present invention does not directly search numeric information (without onerous overhead), but it can be range-tested, once high-speed parsing has determined its nature and location. Thus, the present invention simply preserves numeric information for subsequent analysis, and does not convert it to ordinal form. The numeric field is then cleared 432 to avoid inadvertently emitting it again.

The output subroutine then tests to see if any tokens have been hashed 434, and if so converts the hash to an ordinal 436 as shown in another flow diagram, emits the ordinal into the output 438, and clears the hash 440 in preparation to receive the next token, and returns to the subroutine's caller 442.

In English, periods serve several different functions, so they must be carefully considered during tokenization. Where a period is followed by whitespace 446, where it could signal that the previous word is an abbreviation, or it could signal the end of a sentence. The strategy used here is to first save the hash of the previous letters in the word 448, hash the period at part of the word 450 that calls subroutine Hash at 414, and look up the word in the lexicon (previously allocated ordinals) to see if the word with a period appears in the lexicon 452 showing it to be a known abbreviation. Note that the logic to look up a hash in the lexicon is identical to the logic to convert a hash to an ordinal (as shown in another flow diagram), only with the code to generate new ordinals disabled. The only words with periods in the lexicon will be abbreviations, so if a word a period included in the hash is found, its ordinal is emitted into the output 424 that calls subroutine Output at 426, with analysis continuing with the next character, which in this case will be a whitespace character 412.

If the word including a period was not found in the lexicon, then the previously saved hash without the period will be recovered 454, emitted into the output 456 that calls subroutine Output at 426, and the period will be separately hashed and converted to an ordinal as the end-of-sentence marker 458 that calls subroutine Hash at 414 and emitted into the output 424 that calls subroutine Output at 426, with analysis continuing with the next character, which in this case will be a whitespace character 412.

If the character is punctuation without a following space (a "nonspace," meaning outside of a numeric field) is encountered 444, it is treated just like an alphabetic character 406, except that there is no need to make it lower case 408. Hence, control proceeds directly to hashing it 410, with analysis continuing with the next character 412.

If the character is a paragraph separation character 462 like a carriage return, then any accumulated numeric or hashed information is flushed out 464, which calls subroutine Output at 426, and the ordinal for a paragraph marker is emitted into the output 466 by calling subroutine Output at 426.

If the beginning of a numeric field is encountered 468, control passes to a separate parser 470 to parse the following numeric field 472, which may have embedded "-" indicating range, "/" indicating date, ":" indicating time, "." indicating a decimal point (or European thousands separator), "," indicating thousands separation (or European decimal point), or "A" indicating exponentiation. The numeric field is parsed using ad hoc programming that is not disclosed here 474, with analysis continuing with the next character 476.

Figure 5A:
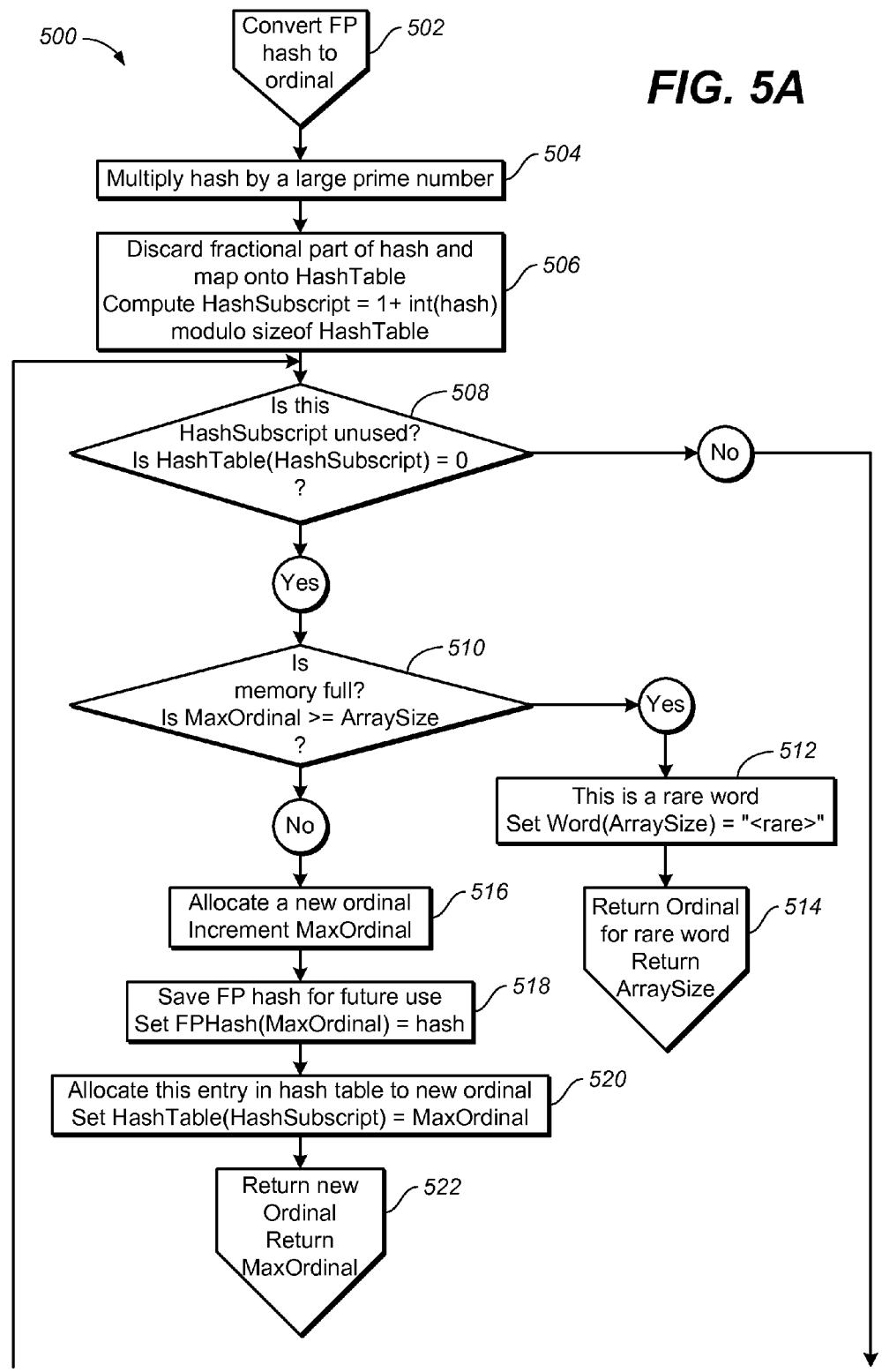
FIG. 5 (comprising FIGS. 5A and 5B) is a partitioned block diagrammatic flow diagram showing details of how floating point hash is converted to ordinals.
Figures 5, 5A, 5B:
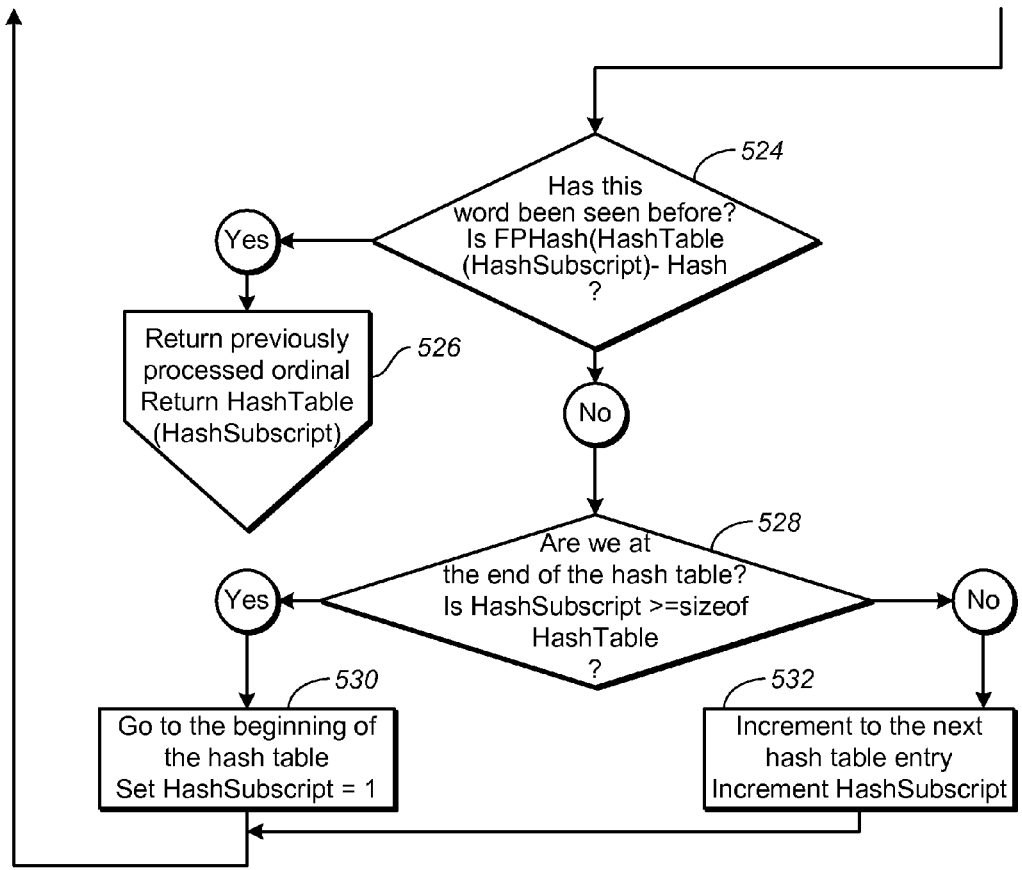

Next, FIG. 5 is a flow diagram 500 showing details of how the FP hash is converted to ordinals. This routine 502 takes a low-quality floating point hash value for a word, and converts it to an ordinal that reflects the frequency of use for that word, with lower numbered ordinals indicating more frequently used words. First, the low-quality floating point hash value is multiplied by a large prime number 504, in order to uniformly spread its values throughout the space of potential subscripts into the hash table (non-prime numbers would probably result in clustered results and subsequent increased collisions that would reduce the efficiency of subsequent searches for correct ordinals). Then, the fraction part of the result is trimmed off, and a subscript into the hash table is developed using a modulo function 506.

If this hash subscript has never been used 508, and if the hash table is already substantially full 510, then there is no place to store another word, so it is handled as a rare word, that need not be processed 512, and the ordinal for a rare word is returned 514.

If this hash subscript has never been used 508, and if the hash table is not substantially full 510, then this word has never before been seen, and we have found an empty place in the hash table in which to file it. The next available ordinal value is allocated 516, and the hash value is associated with this new ordinal 518 so that future tests of this ordinal can confirm/deny whether it is for the same word. This entry in the hash table is allocated to this ordinal 520, and this new ordinal is returned 522.

If this hash subscript has already been used 508, then it must be determined whether it was used for this word, or for some other word 524. If this word has been seen before, then the previously allocated ordinal is returned 526. If we have found some other word in 524, then we must consider using the next cell in the hash table. However, the hash table is circular, so the next increment after the last entry wraps around to the first entry. Hence, it is necessary to see if we are at the end of the hash table 528. If we are already at the end of the hash table, then it is necessary to proceed to the beginning of the hash table 530. Otherwise simply increment the subscript into the hash table 532.

At this point in the logic, a prospective hash table subscript has been tried and failed, and a new prospective hash table subscript has been developed. Evaluate the new hash table subscript 508 and continue looping through this process until either an empty hash table entry is found in which to file this ordinal 512, or the previously allocated ordinal for this word is discovered 526.

Finally, in FIG. 6 we find details 600 regarding the hashing logic used in the present invention. Hashing procedure 602 illustrates the operation of DPFP arithmetic to hash character strings without concern for hardware overflow exceptions. In the preferred embodiment this is implemented as an inline code because it is so short and maximum speed is needed.

The next character is then DPFP added to the accumulation value 604. This character will have the greatest effect on the accumulation value, with lesser contributions by preceding characters.

First, the prior accumulation (if any) is DPFP multiplied by a transcendental number that is a little less than 1.0 606. Pi/4 works well for this purpose. This scrambles the number while reducing it slightly, the equivalent of shifting it about half a bit to the right. The result of this multiplication would be an infinitely long and non-repeating decimal, but it is truncated at the limit of the precision of the double precision hardware. Since the effect of using a constant less than 1.0 is to right shift information, least significant bit truncation errors should be contained in the least significant bit, despite repeated truncation errors.

A weakness of this method is that if a character string is extremely long, the first characters that were hashed may have no effect on the result because the fractional-bit equivalent shifting will push their influence completely off of the least significant bit. This is a problem for words longer than ~100 characters, but since the longest English word is only a quarter that long this is a non-issue. Longer strings could be hashed by DPFP multiplying by a different transcendental number that is closer to 1.0, e.g. $\pi*7/22 \approx 0.9995976625 \ldots$ The problem with multipliers that are very close to 1.0 is that there is a gap below the decimal point that receives no influence. In the case of $\pi*7/22$ the gap is 11 bits long, which is not long enough to cause a "malfunction," but it is long enough to impair whiteness, so $\pi/4$ is preferred, unless its word length limitations prove to be problematical.

This DPFP add-then-DPFP multiply Process (604 and 606) will be repeated for each character, until an entire word has been processed in this manner to produce a hash of the entire word 614.

The hash must be scaled and a portion extracted for use as an index into a large hash table. Scaling is accomplished by DPFP multiplying the hash value by a large prime number 610. A DPFP hash value will have a numeric value of only a few times a character value. Therefore it must be greatly increased in value in order to convert it to an integer and to be able to pick a portion from the middle from which to develop a subscript into a large hash table of a million or so entries.

Extraction of the final result from the middle of the DPFP result improves the whiteness of the result. The low bits may be less white due to the finite-length DPFP number. This adjusts the transcendental multiplier to become the nearest rational number expressible in the DPFP format, so that it is no longer transcendental. The high bits may no longer contain any influence from the early characters.

Then, the fractional part of the result will be removed, e.g. using an "Int" (make an integer) function, and a middle portion will be extracted using a modulo (remainder from a division) operation 612, just as is customary in many integer-based hashing algorithms. Finally, the result is returned 616, to subsequently be used as an initial subscript into a large hash table as part of the process of converting the hash value 614 to an ordinal, as illustrated and explained in FIG. 5.

What the User Sees: The present invention provides an Internet-based meta-process to assist in implementing a process for individuals and businesses to operate, to continuously monitor the Internet for "interesting" content. Where that interesting content is found, the inventive system automatically composes varying responsive messages (including excerpts from the postings) to the people who placed the content onto the Internet. It then places those messages into the Drafts folders of product representatives to review and send to the addressed recipients. For security reasons, the number of messages sent to each sales representative must not be equal.

Users will make the following specifications with the assistance of a website to provide all the help that they might need: (1) The "search criteria" that include instructions for extracting metadata needed to compose messages (a modified BNF [Backus Naur Form] format would work well for this); (2) the formatting of the messages, which works like existing bulk mail generation programs; and (3) the distribution of messages, e.g. among several sales representatives, which will be a simple form to fill out.

What the User Does Not See: To use this system as a representative, users must install special software onto their computers to provide their computers with some capabilities not now built into present software. These include a cooperative web crawler component, so that crawling onto "sensitive" sites like Facebook and Twitter can be distributed over all sales representatives, not just for a particular product, but for all products. This software would also monitor the representatives' own personal access of sensitive sites to avoid enough utilization to attract attention. However, care will be taken not to equalize use, as this could be easily detected. It will be appreciated that Facebook programmers will likely sign up as sales representatives to get "hands on" access to this software to learn how to subvert its operation, so this must work perfectly.

The new capabilities also include an email redirection component, so that specially marked emails can be sent directly to a selected Drafts folder, while also removing any markings that might be later detected by security software.

In addition, some central triage is needed to keep similar users from stumbling over one another. Where several users are selling competing products, it is important to determine which would be the best one to present, and then to present only that one product rather than "dumping" every possible product onto the user. For example, if someone was complaining about the high price of gas, it is important to learn enough to determine whether an economy car, a diesel powered car, a hybrid, or an all-electric car would be best for him before turning the prospect over to any waiting eager salesmen. Alternatively, the prospect might be good candidate for a gasoline rewards card or automobile repair insurance.

Automated methods can detect these situations (by recognizing that several users are looking for the same things). However, manual methods, like insisting that competing users find ways to sub-divide the market, are needed to keep things working smoothly.

Overview of Triage: Careful coordination between vendors will be necessary to avoid having users receive promotions from every vendor who could conceivably meet their needs. Instead, triage is needed to select the most suitable vendor. Where it isn't possible to determine the most suitable vendor, the most suitable vendors should be promoted in a side-by-side comparison.

Triage is a human activity, where teams of people decide the criteria wherein several competing vendors will have their product promoted to prospective users. This may be determined from the posting, or it may require a special user/representative representing several competing vendors to interact with the user to learn more, so that a good decision can be made. This user/representative will earn a commission for his help so that he will be motivated to do a good job.

It is important to note that triage is apparently unworkable if there is more than one company operating a system as described herein. Without triage, the Internet would further devolve into a tsunami of spam that would make it impossible to publicly post much of anything—effectively destroying much of the present utility of the Internet. Hence, it is important to open the triage process to other companies, including even illegal infringers, to keep order on the Internet. Therefore, the legal holder of this patent will probably be forced by circumstances to provide good and fair triage services, even to known infringers, even while those infringers are being sued or executed upon, to preserve the utility of the Internet.

Natural Language Processing: A new theory of language: It is the present inventor's theory that computerized speech and written understanding has eluded developers for the past four decades because of a lack of a fundamental understanding of the task, which turns out to be very similar to patent classification.

When classifying a patent, successive layers of sub-classification are established, until only unique details distinguish one patent from another in the bottom-level subclass. When reviewing the sub-classifications that a particular patent is assigned, combined with the patent's title, it is usually apparent to one skilled in the art what the patent is all about.

However, when a patent is filed into a different patent filing system, e.g. filed in a different country where the sub-classifications may be quite different, it may be possible that the claims overlap the claims of other patents, and/or unclaimed disclosure would be patentable in a different country.

Similarly, when a user speaks or writes, the speaker or author intends most of the words to import a particular "payload" of information into its proper context, much as patent disclosures place claims into the state of an art. However, the listeners or readers may have a very different context in which to file words. They must pick and choose from the words in an effort to place some of them into their own context. What they end up placing may not even be the "payload" intended, but may be words meant for placement. Where no placement seems possible, they might simply ignore the words and conclude the speaker/writer to be ignorant or deranged.

Many teachers have recorded a classroom presentation and transcribed the recording, only to be quite surprised at what they actually said, which can sometimes be the opposite of what they meant to say. Somehow the class understood what they meant to say, even though their statements were quite flawed. When these situations are examined, the placement words were adequate, though imperfect, but the payload was acceptable. Indeed, where another person's world model is nearly identical to the speaker/writer's world model, very few placement words are needed, and so these words are often omitted in casual speech.

Omitted words fracture structure of roughly half of all spoken sentences "in the wild," rendering computerized parsing impossible. Major projects, like the Russian Academy of Science's Russian Translator project, have struggled with this challenge for more than a decade, with each new approach producing a better result. The results are still far short of human understanding due to the lack of a human-level domain context to guide the identification and replacement of omitted words.

As people speak or write to a computer, the computer must necessarily have a very different point of view to even be useful. The computer must be able to address issues that the user cannot successfully address, so its knowledge must necessarily exceed the user's in its subject domain. This leads to some curious conclusions: First, some word placements will probably be interpreted as "statements of ignorance" by the computer and so be processed as valuable payload to teach the user. Second, some word placements will probably refer to things outside of the computer's domain, and so must be ignored, other than being recognized as non-understandable restrictions on the payload, that may itself be impossible to isolate. Third, some intended "payload" words must serve as placement, especially for statements of ignorance.

The present invention seeks to intercept words written to other people who presumably have substantial common domain knowledge. Further, the computer seeks to compose human-appearing responses, despite its necessarily different point of view and lack of original domain knowledge. While this is simply not possible for the vast majority of writings, the computer can simply ignore everything to which it is unable to usefully respond. If one speaks a foreign language, especially if he or she doesn't speak it well, this situation is all too common when listening to others with greater language skills speaking among themselves. The best one can do is to quietly listen until some point in the conversation when he or she understands enough of what the conversationalists are saying, and then he may have something useful to add to the conversation.

Note the similarity to the advertising within the present Google Mail, where they select advertisements based upon the content of email being displayed. Had Google performed a deeper analysis, they could probably eliminate nearly 99% of the ads as not relating to any users' needs, greatly improve the users' experiences, and customize the remaining 1% of the ads to precisely target the users.

That is yet another object and advantage of the present invention, where the computer knows about certain products and solutions to common problems, and so forth, and scans the vastness of the Internet to find people whose words have stated or implied a need for things in the computer's knowledge base in terms that the computer can "understand."

Sequence of NL Processing: In the present invention, natural language (NL) input goes through a sequence of steps in processing: First, words are hashed into floating-point (FP) numbers. For each character, an accumulated value is first multiplied by a transcendental number slightly less than one, and the next character is added in. Using 64-bit double precision arithmetic, this produces unique hashes with a negligible probability that two words will ever produce the same hash. Thereafter, all comparisons are made with floating-point ("FP") hashes using FP arithmetic. To accomplish these string operations, a rule would perform the desired string operations on the characters constituting a word associated with an ordinal within a list of ordinals.

Next, FP Words are then converted to integer ordinal numbers indicating their frequency of use. Hence, the definite article "the," the most common word in English, becomes 1. This is accomplished by using a portion of the FP hash as an index into a large circular array that holds the ordinal values. There will be collisions in the circular table that will cause the ordinals for some words to be stored in later entries of the circular table than the position where the FP hash points. Therefore, several parallel arrays hold information about each ordinal, including an array that holds the FP hash value to use to confirm whether this is indeed the correct ordinal for a particular FP hash.

Then, the first thing read will be approximately 10,000 English words in their order of natural occurrence, e.g., "the" is the first word. Thereafter, identification of least frequently used words can be made by simply comparing their respective ordinal values.

Next, all rules that refer to specific words (as opposed to rules that only refer to other rules) are linked to the least frequently used word(s) needed to satisfy them. For example, if a rule were looking for an occurrence of "the mark," it would be filed with "mark" and check for "the" preceding it, should the word "mark" appear. Otherwise, the rule would lie dormant and require no CPU time.

Rules that refer to other rules will be linked to the rules they refer to, and marked for execution when those rules are executed. In this way, only rules where at least some of the requisites are in place need be executed.

Rules may work over various scopes, including words, phrases, sentences, paragraphs, postings, or users. They may produce metadata retained long after the text has been discarded, including, for instance, contact information about the person making the posting.

Providing the ability to scan the lexicon during initialization for all words having substrings meeting certain criteria, e.g., all words of 5 or more letters ending in "ing" to identify present imperfect verb tense, and adding the same rules to all of those words, confers an ability equivalent to being able to perform similar string operations to identify those same words at run-time. Identifying the potentially affected words during initialization eliminates the run-time execution overhead to identify those words based on substrings contained within them. This method incurs minor overhead only when words having those substrings are actually present.

It is possible to perform string operations on words during run-time to check for particular prefixes, roots, and suffixes, for instance by applying Left, Mid, and Instr operators respectively to the strings in the lexicon that represent the words in the lexicon pointed to by ordinals. This method is slow because it involves working with strings during run-time rather than ordinals, but incurs overhead only when the tests are actually made, and so is of special benefit in rare circumstances, such as when analyzing a particular word only after other semantic criteria have already been met. This method also works on newly coined words (true neologisms) that may not (yet) be in the production lexicon used during initialization, which can be especially important when processing German with its run-on words.

Opportunistic Parsing: Past parsing methods, whether top-down, bottom-up, regular expression, key word, and so forth, are all various forms of "on-demand parsing," meaning that code is executed to make the determinations that they are needed during their analysis, which often results in the execution of other code to make sub-determinations that may be needed. This works well in compilers, where the lexicon is tiny compared with the size of an average computer program.

However, processing natural language, where the lexicon is gigantic compared with the size of an average posting, presents a problem when on-demand techniques are applied. The universal disadvantage of on-demand methods for natural language processing (NLP) is that they are slow—far too slow to process any significant portion of the Internet, and sometimes too slow even to keep up with a single user satisfactorily, despite the availability of computers that have increased in speed by a thousand times since NLP was first demonstrated.

The source of the lack of any apparent strong connection between computer speed and parsing speed over past decades has remained hidden, except to the few practitioners in the art who have either studied developments in NLP or tried to advance the art themselves. Useful programs having apparent expertise in very narrow subject domains, like DrEliza.com, can often be demonstrated with as few as approximately 100 rules that can all be executed without concern for speed in a demonstration setting. Then by adding automatic spelling correction, automatic idiom resolution, compound and complex sentence analysis, and expanding the subject domain to cover an entire discipline, the number of rules increases to nearly 100,000. No one has ever even guessed how many rules might be necessary to pass the Turing test of carrying on simple conversations as well as an average human. (Note that the Turing test does not require expertise, just the ability to carry on a normally intelligent conversation). Fortunately, the present invention does not require this ability.

Hence, there is an approximately 10,000:1 ratio in the computational requirements in going from a simple demonstration program that arguably works but still needs debugging and enhancement, to a fully capable NLP expert system that does pretty much the same thing. At some point between 100 and 100,000 rules, developers gradually realized the enormity of the task, whereupon they gave up and moved on to other projects. This has been a repeating story behind countless abandoned NLP projects spanning the past 40 years.

However, regardless of the number of rules in a system, only a tiny fraction will apply to any particular writing. Most possible spelling errors will not be made. Most possible idioms will not be used. Most possible obscure sentence constructions will not be utilized. Most possibly interesting things will not be said. And so on. Hence, the previously unsolved challenge is to find some way of not doing the analyses needed to confirm that things not found in a particular posting are truly absent.

The present invention accomplishes this with a new approach to parsing—opportunistic parsing, wherein things are done in such a way that only rules with a good chance of being satisfied will even be evaluated. This is done by associating rules with the least frequently used (LFU) words in them. Rules that depend on other rules are then scheduled to be analyzed after their dependent rules have been evaluated.

This effectively moves the problem from how to deal with slow operation to finding a way to efficiently schedule the evaluation of rules so that dependencies are always evaluated first. Done poorly, this scheduling could take as much computer time as the on-demand methods that it replaces. However, there is a means to overcome this challenge.

Natural language has a key characteristic not shared by high level computer languages (except COBOL): The absence of unlimited recursive descent, unlimited negation, and so on. Some past computer languages enforced simplicity in key places—for example, in subscripts that had to be of the form (ax+b) in the original FORTRAN and FORTRAN II—but this was abandoned in later versions of FORTRAN.

This lack of recursive descent means that rules can be arranged into a small number of priority ordered groups of rules that can be evaluated in any order, though all the rules in one group would have to be evaluated before any of the rules in the next lower priority group. For example, it makes no difference in what order spelling corrections are made, but they must all be made before other analyses can be performed. Some things like idiom resolution would have to be split into two or more groups, such as when different idioms share common sequences of words, in which case longer idioms would have to be evaluated first. Rules that alter the input into a more tractable form would have to be performed before the input can be analyzed for content.

Very limited non-recursive descent, enough to handle any needs of natural language processing, can be implemented by duplicating some groups of rules.

Hence, every word that happens to be the LFU word in at least one rule will add functors for those rules to the appropriate lists during preprocessing, the list designations being properties of the rules. As the functors for rules are added to lists, functors for parental rules would also be added to their appropriate lists.

Further details: Every rule will have coded within it the scope of its analysis, limiting it to looking at immediately surrounding words, the same phrase, the entire sentence, the entire paragraph, the entire posting, or all information that has ever been gathered about this author.

The results of evaluating every result-producing rule will be attached to the scope that has been coded within it, addressing whether the result is only available within the same phrase, sentence, paragraph, posting, or for all time for everything this author writes.

Note that rules can alter the structure of scopes, e.g. when complex sentences are chopped into several simple sentences, or when trite sentences like "LOL" are deleted. The easiest way of dealing with this seems to be to attach scope-level information to the thing that terminates the scope, akin to the way that word processors carry paragraph information with the character that terminates the paragraph.

Complex editing requirements can demand that the ordinals be kept in a list structure, where each element points to the elements that precede and follow it.

A given rule may need to be evaluated several times, e.g. due to a LFU word appearing in several places. Each rule will be supplied with its scope and trigger, so each will operate independently with no interaction.

Some rules will be called upon to evaluate multiple times in the same scope, especially in cases of multiple dependencies that have been satisfied. The first time, the rule will be evaluated as usual. The second and later times, the rule will recognize that it has already been evaluated, and will immediately terminate without taking any action. This eliminates the need to eliminate duplicate entries on the list of rules to evaluate that could be costly in computer time.

A rule compiler will construct the dependency graph that interconnects the rules and will attach information to each rule indicating the parent rules to be evaluated later. Unused rules will be deleted from the parser's tables. The compiler will also determine which group each rule should be in. Any structural flaws in the graph, such as circular structures of rules, will be reported out as errors in the overall language specification.

Rules: Prior art systems have relied on a series of ad hoc modules to apply particular kinds of rules, those rules being contained in tables. There was often no clear division between ad hoc code and rule-related code. Further, those modules were written to operate within a particular scope, whether a phrase, a sentence, a paragraph, or complete text. As a result, the logical progression of analysis was necessarily something that had to be coded by a computer programmer, rather than something that could be described by a linguist.

Unfortunately, real-world natural language is not that well organized, so prior art methods invariably resulted in "misunderstanding" the exceptional cases. These "misunderstandings" have been a major contributor to the error rates of automated systems.

In addition to speed, a great advantage of the present invention is that rules of all types can be freely intermixed, so that the need to program "passes" over the text is completely eliminated. Once the underlying structure of this system has been programmed, all NL programming can be performed by linguists who have no knowledge of the underlying computer programming.

While these rules could be created manually, a better approach is to create a compiler that takes rules stated in a high-level form and creates the table entries needed to perform those functions. This compiler would assign priorities so that everything is done in logical order, identify least-frequently-used words used to trigger the syntax-recognizing rules, tokenize the rules for fast interpretation, and so on.

The capabilities of parsing rules are limited only by the imaginations of NL systems designers. Rules of very different types can now be executed in any convenient order. For example, rules with posting-wide scope can identify subject matter, the results of which can be used to disambiguate idioms, whereas prior art systems would first resolve all idioms and perform posting-wide scoped rules last. This has kept prior art systems from disambiguating idiom resolution and many other important issues related to accurate NL "understanding."

With some conceptually simple provisions this is easily possible. For example, logical operators, instead of returning True or False, would return 0% or 100%, so that they could be intermixed with Bayesian fuzzy logic operators. Rules that look for a particular syntax would, in addition to returning 0% or 100% indicating the absence or presence of a particular syntax, would also copy out the syntax that was discovered, for possible output or debugging.

Some of the important capabilities of rules contemplated in the present invention include: (1) substituting zero or more words in place of an identified string. Commonly used for automatic spelling correction and idiom substitution; (2) setting flags in the indicated word/phrase/sentence/paragraph/posting/user scope, to later be checked by other rules having that scope, which is commonly used to indicate time, negation, or subject; (3) checking for particular phrases and sub-phrases, which is commonly used to recognize specific statements; (4) queuing other rules in any word/phrase/sentence/paragraph/posting/user scope, to be placed in the queue associated with that rule, to later be executed when that queue is being emptied, which is commonly used to handle logical ascent/descent. (5) checking sub-strings in words to determine prefix, root, or suffix, which is commonly used to check for suffixes like "ing" to establish present imperfect tense, etc.; (6) logical AND/OR/NOT manipulation of what was found, which is commonly used to check for particular combinations of words, phrases, statements, etc.; (7) fuzzy logic evaluation of what was found, which is commonly used to establish preponderance of evidence to make decisions regarding actions to take; and (8) extraction of strings to return as results, which is commonly used to collect metadata.

The specific order of processing is determined by the particular rules that utilize the above capabilities to determine what is needed to produce replies, after these commands have been compiled into a final form suitable for run-time processing. Processing is further guided by the presence of least frequently used words in the posting being analyzed, so analysis will proceed differently for different postings.

Where possible, the web crawler employed in the inventive system would be customized to indicate who made the posting and their contact information, along with other stored metadata indicating what may have been learned about this user from past postings. Crawlers customized for various Internet domains extract whatever there is of this information as they crawl. One of the goals of processing postings is to add to the metadata about this user, in the hopes of reaching a critical mass, where enough has been learned to construct a useful and productive response. If a user has not been identified either in the metadata or in the posting, no useful processing can be performed on the posting. However, so long as there is enough information to relate this posting to other postings, it is possible that, together with future postings, there will be a critical mass of information.

Review of Method Steps: The first step in processing a posting is to convert the words in the posting to a list of ordinals. During this process information stored along with the ordinals in the lexicon set various word-related flags. Combinations of these flags may indicate useful subject matter, the presence of contact information, subject domain to be used to disambiguate abbreviations and idioms, and so forth.

An initial test is made to see if this posting is worth analyzing. This is done by examining the combination of flags to see if the subject matter is interesting, and whether there is enough identifying information to be able to respond.

Error control is important for accurate recognition, especially in unedited text, as is common on the Internet. Crude techniques can be correct roughly eighty percent of the time. The present state of the art in computational linguistics is approximately ninety percent, and human readers understand the meaning of approximately ninety-five percent of unedited text. The primary means of improving accuracy is to look for confirming repetition of information. When two 80% accurate analyses agree on something, the result is correct ~96% of the time. When two 90% processes agree, the result is correct 99% of the time. This quadratic effect improves the overall accuracy by twice as much as the individual improvements help the computer "understand" what has been written. In the above example, a 2:1 reduction in the crude recognition error rate made a 4:1 reduction in the error rate of conclusions drawn upon the crude recognitions.

Once the posting has been processed in, with ordinals having been assigned in place of words and pointers to rules placed into appropriate queues, processing starts with the highest priority queue having any rules to process. There will be many variances from well-organized processing, as English has many lapses in structure. However, the following reflects the main stream of processing. Each of these steps reflects the structure of the rules and are not pre-programmed in the code.

Edit the list of ordinals: Unedited text often has many spelling errors. Correcting them greatly improves the overall accuracy. Idioms and other language peculiarities also take their toll. Automatic spelling correction is thus performed by recognizing common misspellings of words. There are approximately 300 commonly misspelled words, approximately 1,000 common misspellings, and approximately 20,000 less common misspellings. The method used in the present invention imposes no additional overhead for having thousands of misspellings in its lexicon.

Idiom resolution. This step is done by keying idioms to the least commonly used word that appears in them, and where this word is found, examining the surrounding words to see if the idiom is present. Upon finding an idiom, words will be substituted that plainly mean the same thing. For example, "the best government that money can buy" would be replaced with "a corrupt government." There are many idioms that, depending on use, may also mean exactly what they say, so disambiguation is often necessary. The flags set in the previous phase will guide this disambiguation.

Process conjunctions: The next challenge is extracting the objective facts from subjective writing. The main tool for this is chopping long sentences apart into simple sentences at any conjunctions that appear. For example, the sentence "I have a headache because I got drunk last night," contains two facts and one hypothesis. The facts are: "I have a headache." and "I got drunk last night." The hypothesis that there is a cause-and-effect relationship between these facts is indicated by the word "because." AI programs are not (yet) interested in this because they cannot yet usefully add such hypotheses to their existing knowledge bases. Stripping hypotheses and other factual interrelationships out of compound and complex sentences allows them to be chopped apart into simple sentences for more accurate analysis. This greatly simplifies the extraction of facts, especially from poorly constructed sentences, because errors in structure or analysis can usually be isolated to a single fact, which may not even be important to the operation of the present invention.

Identify elements of fact: Once the posting has been cleaned up, it becomes possible to identify factual elements in the writing. Factual elements are details like <first-person statement>, <indication of dissatisfaction>, <excessively high price>, <refers to fuel>, <refers to a vehicle>, etc. Before the present invention, this was typically performed using regular expressions to recognize substrings containing factual elements. This often required "Boolean AND of ORs" logic to handle the myriad alternative words that could be used in combination to say the same things. The regular expression evaluators that come with most computer languages do not have this particular ability, so it must be added for the system to handle many alternative ways of saying the same things. In DrEliza.com, this was accomplished with a wrapper subroutine that utilized the supplied regular expression evaluator (the Like operator) that was native to the language in which it was written (Microsoft Visual Basic) to do the part of the task that it was able to do. The Like operator was embedded in wrapper code to do the rest. However, this class of technique was orders of magnitude too slow for the present invention, so an entirely new method had to be developed. Note that this analysis must identify the tense, time, and negations that are utilized, to correctly identify relevant statements of fact.

Identify statements of fact: In the present invention, examination for the presence of a factual element is triggered by the presence of the least frequently used word in the rule. Where "Boolean AND of ORs" logic is used, every word in just one of the OR alternatives must be used as a trigger. Then, surrounding words are examined as needed to determine whether the rule has been satisfied. Since the present invention utilizes ordinals that can be compared with single machine instructions, examining the surrounding words is accomplished by native computer instructions requiring only a few nanoseconds, rather than by slow string subroutines utilized in preceding AI systems.

Identify factual situations: Once the factual elements have been identified, they must be considered in groups to determine (interesting) factual situations. Using the previous example, a statement in a posting like "I am being bankrupted by the cost of gasoline for my junker" would produce elements <first-person statement><indication of dissatisfaction><excessively high price><refers to fuel><refers to a vehicle>, which, considered together, would identify a person who is having a problem with the high price of fuel for their vehicle, and hence might be a good prospect for a fuel conservative vehicle like a hybrid car. These evaluations would be triggered by the least frequently used term in them, which in this case would probably be one of the words in <refers to fuel>, e.g. "gasoline."

Identify opportunities: After identification of facts, consideration of them in groups must be made to reach determinations, like whether this person probably has enough money to purchase the solutions to his problems. Decisions are made based on those determinations, such as what particular product(s) and service(s) this person might be interested in purchasing, whether it is worth sending him a response, etc. This cannot be done with simple logic, but rather must necessarily involve Bayesian ("fuzzy math") arithmetic performed with ad hoc heuristics to first compute probabilities, and based on the probabilities make decisions.

The biggest challenge for using these methods is missing information—and there is nearly always valuable information that is missing. A new method of handling missing information in heuristic analyses has been successfully tested by the present inventor in connection with DrEliza.com. The symptoms for each prospective condition were listed in decreasing order of likelihood of occurrence. Each successive symptom that was mentioned had an 80% effect on the remaining probability, with unmentioned symptoms having no effect on the computations. Hence, if only one symptom of a condition was mentioned, whether it was the first, second, or third symptom in the list made no difference in computing probability that they had a related condition. Where negative statements were made, i.e., that they did not have a particular symptom, the negative indication counted more greatly than a positive indication. Negative statements occurred most often in response to questions from DrEliza.com. This, in combination with asking about more important (earlier in the list) symptoms than those that were mentioned, produced excellent results.

However, the present invention has yet to establish a running conversation with the other users on the Internet, so queries for more information must be carefully weighed in relating their value with their annoyance. In some settings, like offering medical advice as DrEliza.com has done, asking questions may be looked upon as a good thing because it displays some intelligence. However, prospective customers are not likely to appreciate someone drilling down into their product preferences without first having been asked to do so. Two measures deal with the uncertainties attendant with acting without resolving unanswered questions: (1) heuristics, to ascertain whether enough has been learned to act in relative safety, and (2) weasel words in replies like "if . . . " and "presuming . . . " to condition advice on facts that are not presently known.

DrEliza.com on the Internet works only with text directed to it. DrEliza was experimentally interfaced to Dragon NaturallySpeaking ("DNS") to evaluate the problems with speech I/O. This interface required approximately 100 pages of programming to implement workarounds to many bugs, implement a markup facility to instantly respond to interruptions where DNS was too slow, and implements multiple speakers (the primary AI, an assistant who provided routine background information to fill gaps while DNS analyzed speech, and the operating system, that reported operational difficulties). The multiple speaker facility was a kludge, requiring on-the-fly reinitializing and reconfiguring the speech I/O system.

Where the speech recognition software is on a client machine and the NLP software is on a distant server, a significant ping time between them would make it impossible to handle interruptions in a reasonable way. Our experimental setup resolved this by implementing a markup system that provided for dynamically preselected responses to interruptions. Note that sometimes implementers want the user to be able to interrupt the system, e.g., when the system is saying something to occupy time while analysis is being performed, while at other times implementers want to interrupt the user and tell them to wait, e.g., when the system is having an issue that it needs to have addressed.

DNS tended to understand technical terms and phrases correctly, but failed to understand other words almost as often as it succeeded. The net effect is that it recognized important phrases well enough to diagnose people's spoken health issues, but people seeing that it misunderstood as many other words as it got right, often refused to accept either the process or its correct findings.

It became clear that new features to existing speech recognition products would be needed, before they would be usable outside of narrow subject domains like chronic illnesses. The primary problems are that existing products take too long to respond, take too much CPU overhead, and make wild guesses at what was said when they are less certain, and in the process produce words in other unrelated domains, which would cause problems with the present invention.

Part of this was overcame in experiments conducted by the present inventor by using long-obsolete versions of DNS, which were designed to run on much slower computers. These obsolete versions responded more quickly and used less of the CPU, leaving more CPU for the other AI-related activities. Even so, their vocabularies were too large, often producing references to people's names when processing less intelligible text. Using old versions came at the high price of having to endure numerous long-corrected bugs in their software.

Before existing speech I/O products would be practical for NLP applications, they would need: (1) Dynamically variable/selectable depth off analysis, so that a reasonable balance between speed and performance could be sought. Note that very early versions of DNS provided the ability to use even earlier/faster recognizers, but this ability was later abandoned. (2) Dynamically variable/selectable threshold of acceptance, below which the product would simply fail to respond. This would quickly train users to speak clearly, and avoid producing garbage output. (3) Dynamically selectable sub-sections of the vocabulary, so an attached NLP could alert it as to which groups of words were likely to be present. More vocabulary might sound like an unqualified good thing, but beyond a certain point it only encourages the speech recognition system to produce homonyms, often proper names, instead of what was actually spoken. (4) Dynamically adjustable access to the CPU available for speech recognition, so that it doesn't use so much that it blocks other AI-related activities. (5) Multiple dynamically selectable speaker voices as a feature.

Where the NLP is on the other end of an Internet connection, the ability to specify in advance of an utterance, what to do if the utterance was interrupted by the user.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative but equivalent operational features, operations, method steps, functions, or the like.

Therefore, the above description and illustrations should not be construed as limiting the scope of the invention, which is defined by the appended claims.

What is claimed as invention is:

1. A method of computer-processing natural language text on a computer programmed to execute a parsing program and connected to a computer network so as to recognize the presence of words, phrases and sentences having certain specific meanings, comprising the steps of:
　(a) initializing the computer using initialization files stored in the computer or independently using a separate compiling or configuring process;

(b) during step (a) initialization, loading into memory a plurality of words in order of decreasing frequency of use, wherein the words are used to determine which words with which to associate rules, and wherein only words that are the least frequently used words in rules are used to trigger those rules;

(c) associating rules with the least frequently used word(s) the rules require to be satisfied, wherein higher level rules will be queued when lower level rules have been evaluated;

(d) converting input words to hashed tokens;

(e) converting the tokens produced in step (d) to numbers indicating the respective words they represent;

(f) gathering pointers to the rules, each pointer being associated with a least frequently used word, and queuing them into appropriate priority-ordered queues of rules to perform;

(g) repetitively evaluating the first rule on the highest priority queue, until all rules have been evaluated;

(h) returning the results of evaluating certain rules as output; and (i) passing the output of step (h) to a next stage of processing.

2. The method of claim 1, wherein the rules referred to in steps (b), (c), (f), and (g) include one or more language processing subroutines selected from the group consisting of spelling correction, idiom replacement, tense identification, relevant subject matter identification, intentional or unintentional elision replacement, abbreviation replacement, jargon and slang replacement, sentiment analysis, sentence breaking, and word sense disambiguation.

3. A method of processing natural language text on a computer for connected to a computer network and having computer-executable instructions for performing a method to identify text having specific semantic meaning, comprising the steps of:

(a) loading onto a non-transitory computer readable medium an input list of words in order of decreasing frequency of use;

(b) determining which words with which to associate rules based on the frequency of use of words loaded in step (a);

(c) associating rules with the least frequently used word(s) that the rules require to be satisfied;

(d) converting the input words to hashed tokens;

(e) converting the tokens created in step (d) to numbers indicating the particular word each token represents;

(f) collecting the rules associated with each word;

(g) queuing the rules gathered in step (f) into appropriate priority-ordered queues of rules to perform;

(h) evaluating the first rule on the highest priority queue;

(i) repeating step (h) until all rules have been evaluated;

(j) returning the results step (i) as output; and (k) passing the output of step (j) onto a next stage of processing.

4. The method of claim 3, wherein step (d) hashing is performed by floating-point DPFP multiplying an accumulated hash by a constant less than 1.0 and DPFP adding in the next character, these two operations performed in either order.

5. The method of claim 4, wherein the constant is the binary double precision floating point representation of a number that is a close approximation to a transcendental number.

6. The method of claim 3, wherein the words in step (c) are represented by numbers that reflect their relative usage, wherein with the most commonly used word "the" is represented by the number 1.

7. The method of claim 3, wherein step (g) includes queuing higher level rules when lower level rules have been evaluated.

8. The method of claim 3, wherein step (b) includes gathering pointers to associated rules as words are encountered and controlling the order of execution of rules.

9. The method of claim 8, wherein controlling the order of execution of rules includes filing pointers in priority-ordered queues.

\* \* \* \* \*